United States Patent
Kohda et al.

(10) Patent No.: US 7,081,631 B2
(45) Date of Patent: Jul. 25, 2006

(54) RADIATION IMAGE STORAGE PANEL

(75) Inventors: Katsuhiro Kohda, Kaisei-machi (JP); Seiji Tazaki, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 10/112,744

(22) Filed: Apr. 2, 2002

(65) Prior Publication Data
US 2002/0166977 A1   Nov. 14, 2002

(30) Foreign Application Priority Data
Apr. 3, 2001  (JP) .............. 2001-104144
Aug. 30, 2001 (JP) .............. 2001-261945
Sep. 5, 2001  (JP) .............. 2001-269380

(51) Int. Cl.
*G03B 42/08* (2006.01)

(52) U.S. Cl. .................... 250/484.4

(58) Field of Classification Search .......... 250/484.4
See application file for complete search history.

(56) References Cited

U.S. PATENT DOCUMENTS

| | | | |
|---|---|---|---|
| 4,816,679 A | | 3/1989 | Sunagawa et al. |
| 4,922,103 A | | 5/1990 | Kawajiri et al. |
| 5,519,229 A | * | 5/1996 | Verbeke et al. .......... 250/484.4 |
| 5,751,001 A | * | 5/1998 | Verbeke .................. 250/484.4 |
| 6,191,426 B1 | * | 2/2001 | Hayakawa et al. ...... 250/484.4 |
| 6,455,868 B1 | * | 9/2002 | Arakawa .................. 250/588 |

FOREIGN PATENT DOCUMENTS

| | | | |
|---|---|---|---|
| EP | 0108982 A2 | * | 5/1984 |
| JP | 60-111568 A | | 6/1985 |
| JP | 60-236354 A | | 11/1985 |
| JP | 1-101540 A | | 4/1989 |
| JP | 2001004799 A | * | 1/2001 |

* cited by examiner

*Primary Examiner*—Constantine Hannaher
(74) *Attorney, Agent, or Firm*—Sughrue Mion, PLLC

(57) ABSTRACT

A radiation image storage panel comprises a first rigid layer, and a stimulable phosphor layer, which is overlaid on the first rigid layer. A filler layer is located by adhesion on the side of the first rigid layer, on which side the stimulable phosphor layer is overlaid, or a filler layer is located by adhesion on the side opposite to the side of the first rigid layer, on which side the stimulable phosphor layer is overlaid. A second rigid layer is overlaid by adhesion on the filler layer. The density of the filler layer is lower than the density of the first rigid layer and the density of the second rigid layer. The radiation image storage panel exhibits little deflection by gravity and is capable of yielding a reproduced radiation image having good image quality.

14 Claims, 12 Drawing Sheets

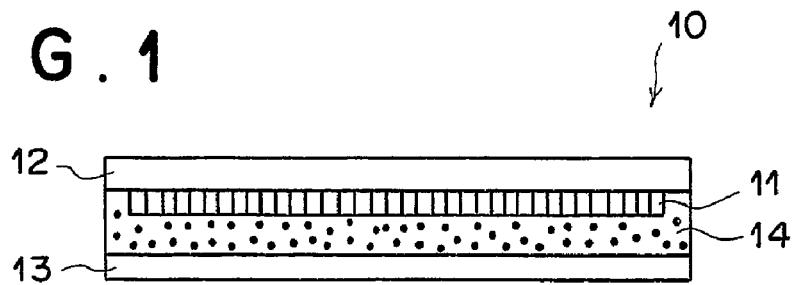
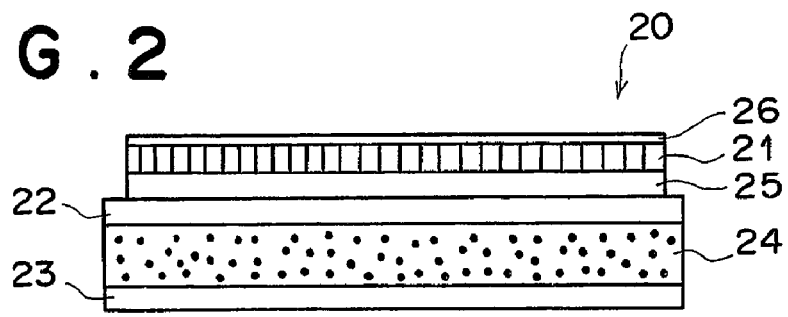
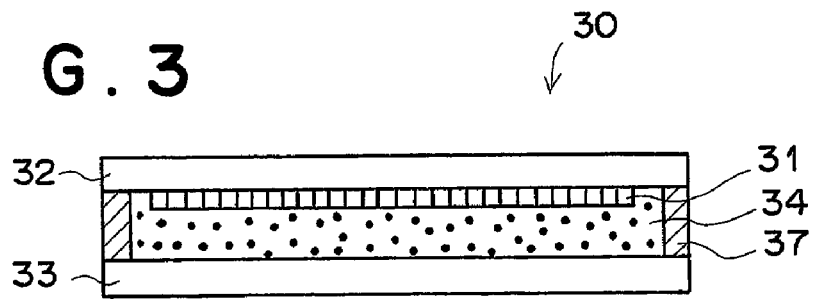
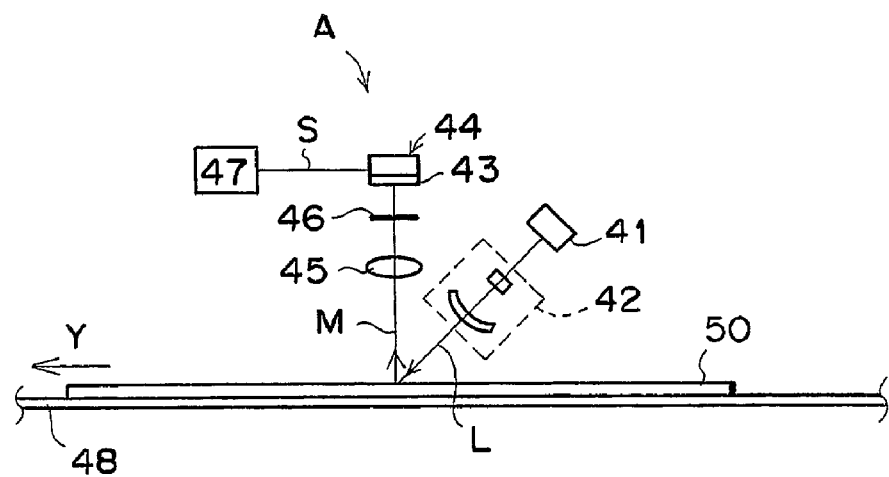

F I G . 7
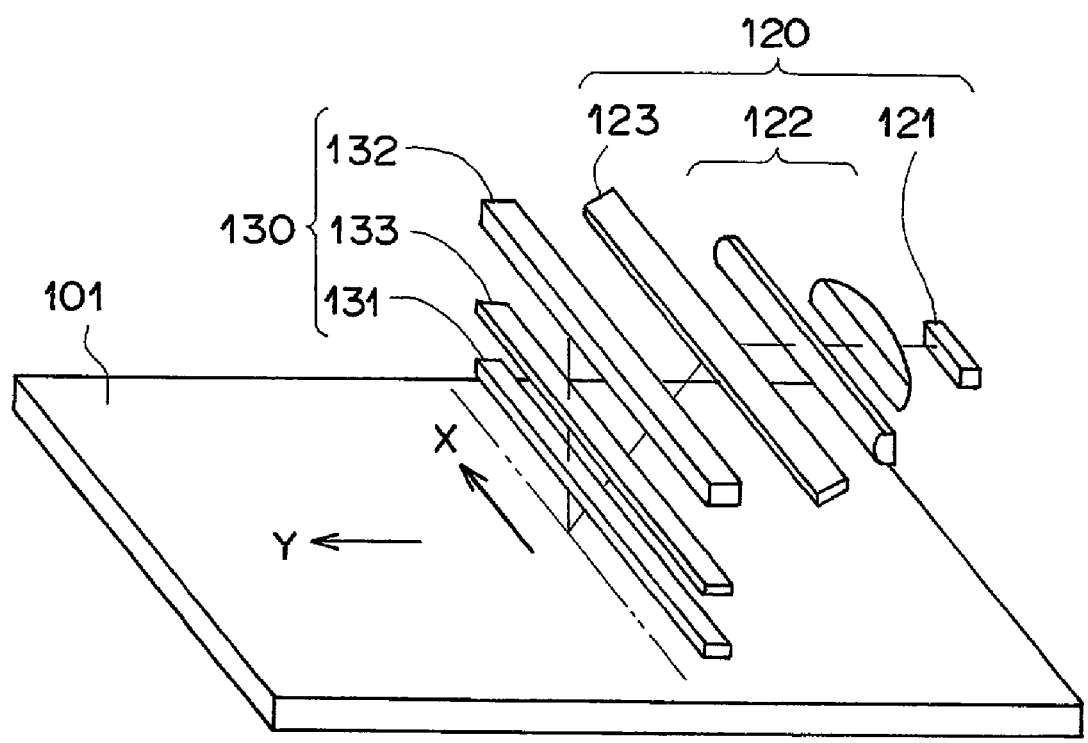

F I G . 15
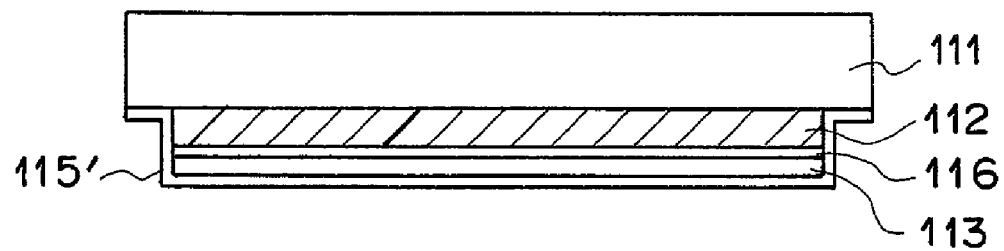

RADIATION IMAGE STORAGE PANEL

BACKGROUND OF THE INVENTION

1. Field of the Invention

This invention relates to a radiation image storage panel for use in radiation image recording and reproducing techniques, in which phosphors are utilized.

2. Description of the Related Art

Radiation image recording and reproducing systems, in which radiation image storage panels (i.e., stimulable phosphor sheets) comprising a substrate and a layer of a stimulable phosphor overlaid on the substrate are utilized, have widely been used in practice.

With the radiation image recording and reproducing systems, for example, radiation carrying image information of an object, such as a human body, is irradiated to the radiation image storage panel, and a radiation image of the object is recorded on the radiation image storage panel. Thereafter, the radiation image storage panel, on which the radiation image of the object has been stored, is exposed to stimulating rays, which cause the radiation image storage panel to emit light in proportion to the amount of energy stored thereon during its exposure to the radiation. The light emitted by the radiation image storage panel, upon stimulation thereof, is photoelectrically detected and converted into an electric image signal, which represents the radiation image, by photoelectric read-out means.

The image signal, which has been obtained from the radiation image recording and reproducing systems described above, is then subjected to image processing, such as gradation processing and processing in the frequency domain, such that a visible radiation image, which has good image quality and can serve as an effective tool in, particularly, the efficient and accurate diagnosis of an illness, is capable of being obtained. The image signal having been obtained from the image processing is utilized for reproducing a visible image for diagnosis, or the like, on film or on a cathode ray tube (CRT) display device. In cases where the radiation image storage panel, from which the image signal has been detected, is then exposed to erasing light, and energy remaining on the radiation image storage panel is thereby released, the erased radiation image storage panel is capable of being used again for the recording of a radiation image.

Novel radiation image read-out apparatuses for use in the radiation image recording and reproducing systems described above have been proposed in, for example, Japanese Unexamined Patent Publication Nos. 60(1985)-111568, 60(1985)-236354, and 1(1989)-101540. In the proposed radiation image read-out apparatuses, a line light source for irradiating linear stimulating rays onto a radiation image storage panel is utilized as a stimulating ray source, and a line sensor comprising a plurality of photoelectric conversion devices arrayed along the length direction of a linear area of the radiation image storage panel, onto which linear area the stimulating rays are irradiated by the line light source, is utilized as photoelectric read-out means. (The length direction of the linear area of the radiation image storage panel is referred to also as the main scanning direction.) Also, the proposed radiation image read-out apparatuses comprise scanning means for moving the radiation image storage panel with respect to the line light source and the line sensor and in a direction, which is approximately normal to the length direction of the linear area of the stimulable phosphor sheet. (The direction, which is approximately normal to the length direction of the linear area of the stimulable phosphor sheet, is referred to also as the sub-scanning direction.) With the proposed radiation image read-out apparatuses, wherein the linear stimulation of the radiation image storage panel and the linear readout from the radiation image storage panel are performed by the utilization of the line light source and the line sensor, the emitted light detection time is capable of being kept short, the size of the apparatus is capable of being kept small, and the cost is capable of being kept low.

In the radiation image read-out apparatuses utilizing the line sensors, the light is emitted in a scattered form from the radiation image storage panel. Therefore, a light guide member and a light collecting mirror are located in the vicinity of the position, which is exposed to the stimulating rays, and the light emitted in the scattered form from the radiation image storage panel is reflected by the light collecting mirror toward the light guide member. In this manner, the efficiency, with which the light emitted by the radiation image storage panel is collected, is enhanced. Alternatively, a distributed index lens array, such as a SELFOC lens array or a rod lens array, is utilized in order to enhance the degree of collection of the light, which has been emitted from each of exposed sites of the radiation image storage panel, on the line sensor.

In radiation image read-out apparatuses, when the radiation image is read out from the radiation image storage panel, the radiation image storage panel is set, for example, in a horizontal state or a vertical state. Therefore, it often occurs, depending upon the state in which the radiation image storage panel is set for the image read-out operation, that the radiation image storage panel is deflected by gravity, though not buckled, and the horizontality of the radiation image storage panel becomes low under the influence of gravity.

In particular, in the cases of small-sized radiation image read-out apparatuses, the image readout from the radiation image storage panel is ordinarily performed from the side opposite to a radiation irradiation side. In such cases, such that the stimulating rays irradiated to the radiation image storage panel and the light emitted by the radiation image storage panel may not be blocked, supporting of the radiation image storage panel is performed only from two sides extending in the longitudinal direction of the radiation image storage panel (i.e., the sub-scanning direction). Therefore, in such cases, the horizontality of the radiation image storage panel is apt to become low.

If the horizontality of the radiation image storage panel becomes low, the beam size of the stimulating rays impinging upon the surface of the radiation image storage panel will vary, and the efficiency, with which the light emitted by the radiation image storage panel is collected, will become low. As a result, the image quality of the image reproduced from the image signal detected from the radiation image storage panel will become bad. Particularly, in the cases of the small-sized radiation image read-out apparatuses described above, an optical lens is ordinarily utilized for collecting the light, which has been emitted by the radiation image storage panel. However, the allowance range of the optical lens with respect to the lowering of the horizontality of the radiation image storage panel is narrow. Therefore, the tendency of the collected light quantity to decrease due to, for example, a shift of a point, upon which the stimulating rays impinge, is reinforced, and the image quality of the image reproduced from the image signal detected from the radiation image storage panel is caused to become bad.

As a technique for enhancing the horizontality of the radiation image storage panel, it may be considered to set the thickness of a glass plate or a carbon plate acting as the substrate of the radiation image storage panel at a large value. However, with such a technique for enhancing the horizontality of the radiation image storage panel, the radiation image storage panel itself becomes heavy and inconvenient for processing. Also, in cases where the irradiation of the radiation is performed from the substrate side of the radiation image storage panel, the problems will occur in that absorption of the radiation by the substrate occurs markedly, and the image quality of the image reproduced from the image signal detected from the radiation image storage panel becomes bad.

SUMMARY OF THE INVENTION

The primary object of the present invention is to provide a radiation image storage panel, which exhibits little deflection by gravity and is capable of yielding a reproduced radiation image having good image quality.

Another object of the present invention is to provide a radiation image storage panel, which exhibits a high horizontality and is capable of yielding a reproduced radiation image having good image quality.

The present invention provides a first radiation image storage panel, comprising:

i) a first rigid layer, ii) a stimulable phosphor layer, which is overlaid on the first rigid layer, iii) a filler layer located by adhesion on a side of the first rigid layer, on which side the stimulable phosphor layer is overlaid, and iv) a second rigid layer, which is overlaid by adhesion on the filler layer, a density of the filler layer being lower than the density of the first rigid layer and the density of the second rigid layer.

The term "rigid layer" as used herein for the first radiation image storage panel in accordance with the present invention (and for a second radiation image storage panel in accordance with the present invention, which will be described later) means the layer having a modulus of elasticity of at least $1 \times 10^5$ (kgf/cm$^2$). Each of the first rigid layer and the second rigid layer should preferably have a modulus of elasticity ranging from $2 \times 10^5$ to $1 \times 10^8$ (kgf/cm$^2$). Each of the first rigid layer and the second rigid layer should more preferably be constituted of a material exhibiting little radiation absorption. The material exhibiting little radiation absorption is ordinarily the material having a density ranging from approximately 0.1 g/cm$^3$ to approximately 1.7 g/cm$^3$. Examples of preferable materials exhibiting little radiation absorption include an Al plate, glass, carbon, and FPF. The first rigid layer and the second rigid layer may be constituted of an identical material, which has a density higher than the density of the filler layer. Alternatively, the first rigid layer and the second rigid layer may be constituted of different materials, each of which has a density higher than the density of the filler layer.

In the first radiation image storage panel in accordance with the present invention, the filler layer is located between the first rigid layer and the second rigid layer and has a density lower than the density of the first rigid layer and the density of the second rigid layer. Since the density of the filler layer is lower than the density of the first rigid layer and the density of the second rigid layer, the filler layer exhibits little radiation absorption.

The expression of "filler layer located by adhesion on a side of a first rigid layer, on which side a stimulable phosphor layer is overlaid" as used herein for the first radiation image storage panel in accordance with the present invention means that the filler layer is located by adhesion not only on the stimulable phosphor layer, which is overlaid on the first rigid layer, but also on an area of the first rigid layer, which area is not covered by the stimulable phosphor layer, i.e. on the area of the first rigid layer outward from the periphery of the stimulable phosphor layer overlaid on the first rigid layer. Also, the expression of "second rigid layer, which is overlaid by adhesion on a filler layer" as used herein means that the filler layer, the first rigid layer, and the second rigid layer are adhered to one another and combined into an integral body.

The present invention also provides a second radiation image storage panel, comprising:

i) a first rigid layer, ii) a stimulable phosphor layer, which is overlaid on the first rigid layer, iii) a filler layer located by adhesion on a side opposite to the side of the first rigid layer, on which side the stimulable phosphor layer is overlaid, and iv) a second rigid layer, which is overlaid by adhesion on the filler layer, a density of the filler layer being lower than the density of the first rigid layer and the density of the second rigid layer.

In the second radiation image storage panel in accordance with the present invention, the stimulable phosphor layer is overlaid on the first rigid layer. Specifically, the stimulable phosphor layer may be overlaid directly on the first rigid layer. Alternatively, the stimulable phosphor layer may be overlaid on the first rigid layer with a different layer, such as a substrate, intervening between the stimulable phosphor layer and the first rigid layer.

In the second radiation image storage panel in accordance with the present invention, the filler layer is located by adhesion on the side opposite to the side of the first rigid layer, on which side the stimulable phosphor layer is overlaid, and the second rigid layer is overlaid by adhesion on the filler layer. Specifically, the filler layer, the first rigid layer, and the second rigid layer are adhered to one another and combined into an integral body.

The first and second radiation image storage panels in accordance with the present invention should preferably be utilized in a manner such that irradiation of radiation to the radiation image storage panel is performed from one of two surface sides of the radiation image storage panel, and readout of a radiation image, which has been stored in the stimulable phosphor layer when the radiation image storage panel is exposed to the radiation, is performed from the other surface side of the radiation image storage panel.

The term "readout of a radiation image" as used herein means the operation for exposing the radiation image storage panel to the stimulating rays, which cause the radiation image storage panel to emit light in proportion to the amount of energy stored thereon during its exposure to the radiation, and detecting the light emitted by the radiation image storage panel.

Also, the first and second radiation image storage panels in accordance with the present invention should preferably be utilized in a radiation image read-out apparatus constituted such that the radiation image storage panel, on which a radiation image has been stored, is exposed to stimulating rays, which cause the radiation image storage panel to emit light in proportion to the amount of energy stored thereon during its exposure to radiation, and the light emitted by the radiation image storage panel is collected through an optical lens onto light receiving means.

Further, the inventors conducted extensive research about gravity deflection of radiation image storage panels, and found a criterion concerning a gravity deflection quantity of a radiation image storage panel, such that the image quality of a radiation image obtained with a radiation image read-out apparatus employing a line scanning read-out technique may be kept good. A third radiation image storage panel in accordance with the present invention is based upon such findings. Also, the inventors found a layer thickness condition of a rigid sheet or a substrate of the radiation image storage panel, such that the rigid sheet has a rigidity sufficient for the gravity deflection of the radiation image storage panel to be reduced and is capable of transmitting a required quantity of the stimulating rays and a required quantity of the light emitted by the radiation image storage panel.

Specifically, the present invention further provides a third radiation image storage panel, comprising a rigid sheet and a phosphor layer formed on the rigid sheet, wherein a deflection quantity of the radiation image storage panel, which deflection quantity occurs when the radiation image storage panel is supported at two sides of the radiation image storage panel, the two sides standing to face each other, and the radiation image storage panel is thus held horizontally, is at most 1,000 µm.

In the third radiation image storage panel in accordance with the present invention, the deflection quantity of the radiation image storage panel should preferably be at most 500 µm, and should more preferably be at most 200 µm.

Also, in the third radiation image storage panel in accordance with the present invention, the rigid sheet ordinarily acts as a protective layer. The rigid sheet should preferably be constituted of a glass sheet. In such cases, a thickness D (in units of mm) of the rigid sheet satisfies the formula:

$$L/110 < D < 15$$

wherein L (in units of mm) represents the distance between the positions which secure and support the two sides of the radiation image storage panel.

Further, in the third radiation image storage panel in accordance with the present invention, the phosphor layer should preferably be formed on the rigid sheet such that the phosphor layer is in contact with the rigid sheet. Furthermore, in the third radiation image storage panel in accordance with the present invention, the phosphor layer should preferably be a layer constituted of a stimulable phosphor.

Also, the inventors conducted extensive research about gravity deflection of radiation image storage panels, and found a range of a gravity deflection quantity of a radiation image storage panel, such that the image quality of a radiation image obtained with a radiation image read-out apparatus employing a line scanning read-out technique may be kept good. A fourth radiation image storage panel in accordance with the present invention is based upon such findings. Further, the inventors found ranges of conditions of a modulus of elasticity in flexure and a thickness of a substrate of the radiation image storage panel, such that the substrate exhibits a radiation absorptivity of at most 20% and has a rigidity sufficient for the gravity deflection of the radiation image storage panel to be reduced.

Specifically, the present invention still further provides a fourth radiation image storage panel, comprising a rigid substrate, which exhibits a radiation absorptivity of at most 20%, and a phosphor layer overlaid on the rigid sheet, wherein a deflection quantity of the radiation image storage panel, which deflection quantity occurs when the radiation image storage panel is secured and supported at two sides of the radiation image storage panel, the two sides standing to face each other, and the radiation image storage panel is thus held horizontally, is at most 1,000 µm.

In the fourth radiation image storage panel in accordance with the present invention, the deflection quantity of the radiation image storage panel should preferably be at most 500 µm, and should more preferably be at most 200 µm. Also, in the fourth radiation image storage panel in accordance with the present invention, the radiation absorptivity of the rigid substrate should preferably be at most 10%.

Further, in the fourth radiation image storage panel in accordance with the present invention, the rigid substrate should preferably be constituted of a carbon fiber-reinforced plastic sheet. Furthermore, in such cases, a modulus of elasticity in flexure of the rigid substrate should preferably fall within the range of 13 MPa to 8 Gpa (approximately $1.3 \times 10^2$ kgf/mm$^2$ to approximately $8 \times 10^4$ kgf/mm$^2$), and a thickness of the rigid substrate should preferably fall within the range of 1 mm to 3.5 mm. The modulus of elasticity in flexure of the rigid substrate should more preferably fall within the range of 500 MPa to 4 Gpa (approximately 5,000 kgf/mm$^2$ to approximately 40,000 kgf/mm$^2$), and the thickness of the rigid substrate should more preferably fall within the range of 1.5 mm to 2.5 mm.

Also, in the fourth radiation image storage panel in accordance with the present invention, a protective layer should preferably be formed on a surface of the phosphor layer, which surface is opposite to the surface side provided with the rigid substrate. Further, in the fourth radiation image storage panel in accordance with the present invention, the phosphor layer should preferably be a layer constituted of a stimulable phosphor.

With the first radiation image storage panel in accordance with the present invention, the stimulable phosphor layer is overlaid on the first rigid layer, and the filler layer is located by adhesion on the side of the first rigid layer, on which side the stimulable phosphor layer is overlaid. Further, the second rigid layer is overlaid by adhesion on the filler layer, and the density of the filler layer is lower than the density of the first rigid layer and the density of the second rigid layer. Also, with the second radiation image storage panel in accordance with the present invention, the stimulable phosphor layer is overlaid on the first rigid layer, and the filler layer is located by adhesion on the side opposite to the side of the first rigid layer, on which side the stimulable phosphor layer is overlaid. Further, the second rigid layer is overlaid by adhesion on the filler layer, and the density of the filler layer is lower than the density of the first rigid layer and the density of the second rigid layer. Therefore, the first and second radiation image storage panels in accordance with the present invention are light in weight and exhibit little deflection.

Specifically, in cases where the thickness of a substrate of an ordinary radiation image storage panel is set to be large, a radiation image storage panel exhibiting little deflection is capable of being obtained. However, in such cases, the thus obtained radiation image storage panel becomes heavier than the conventional radiation image storage panel and becomes inconvenient for processing. However, with the first and second radiation image storage panels in accordance with the present invention, wherein the filler layer, which has a density lower than the density of the first rigid layer and the density of the second rigid layer, is sandwiched between the first rigid layer and the second rigid layer, a radiation image storage panel exhibiting little deflection and being light in weight, such that the radiation image storage panel is convenient for processing, is capable of being obtained.

Also, if a radiation image storage panel deflects by gravity, and the horizontality of the radiation image storage panel becomes low, the problems will occur in that, for example, the point, upon which the stimulating rays impinge, varies due to a variation in distance between a stimulating ray source and the radiation image storage panel, and the efficiency, with which the light emitted by the radiation image storage panel is collected, becomes low. As a result, the image quality of the image reproduced from the image signal detected from the radiation image storage panel is caused to become bad. However, with the first and second radiation image storage panels in accordance with the present invention, the filler layer, which has a density lower than the density of the first rigid layer and the density of the second rigid layer, is located by adhesion between the first rigid layer and the second rigid layer. The filler layer, the first rigid layer, and the second rigid layer are thus combined into an integral body. Therefore, with the first and second radiation image storage panels in accordance with the present invention, little deflection occurs with the radiation image storage panel, while the weight of the radiation image storage panel as a whole is being kept light. Accordingly, with the first and second radiation image storage panels in accordance with the present invention, the horizontality of the radiation image storage panel is capable of being enhanced, and a radiation image having good image quality is capable of being obtained from the radiation image storage panel.

Further, with the first and second radiation image storage panels in accordance with the present invention, wherein the filler layer is constituted of a material exhibiting little radiation absorption, the absorption of the radiation is capable of being suppressed, and adverse effects on the image quality of the obtained radiation image are capable of being suppressed to be smaller than with a technique, in which the thickness of a substrate of a radiation image storage panel is set to be large in order for the horizontality of the radiation image storage panel to be enhanced.

Particularly, in small-sized radiation image read-out apparatuses, a technique is ordinarily employed, wherein the irradiation of the radiation to the radiation image storage panel is performed from one of two surface sides of the radiation image storage panel, and the readout of the radiation image, which has been stored in the stimulable phosphor layer when the radiation image storage panel is exposed to the radiation, is performed from the other surface side of the radiation image storage panel. With each of the first and second radiation image storage panels in accordance with the present invention, a radiation image having good image quality is capable of being obtained when the radiation image storage panel is employed in the small-sized radiation image read-out apparatuses described above.

Also, in the small-sized radiation image read-out apparatuses, a technique is ordinarily employed, wherein the radiation image storage panel, on which the radiation image has been stored, is exposed to the stimulating rays, which cause the radiation image storage panel to emit light in proportion to the amount of energy stored thereon during its exposure to the radiation, and the light emitted by the radiation image storage panel is collected through the optical lens onto the light receiving means. With the small-sized radiation image read-out apparatuses described above, if the horizontality of the radiation image storage panel becomes low, a fluctuation in distance between the stimulating ray source and the radiation image storage panel and a fluctuation in distance between the optical lens and the radiation image storage panel will markedly affect, for example, the efficiency, with which the light emitted by the radiation image storage panel is collected, and the image quality of the obtained radiation image will become bad. However, in cases where the first or second radiation image storage panel in accordance with the present invention is utilized in the small-sized radiation image read-out apparatuses described above, a radiation image having good image quality is capable of being obtained.

With the third radiation image storage panel in accordance with the present invention, the phosphor layer is supported by the rigid sheet, such that the gravity deflection quantity of the radiation image storage panel as a whole is set to be at most the predetermined value, and the horizontality of the radiation image storage panel is enhanced markedly. Therefore, the radiation image having been stored on the radiation image storage panel is capable of being read out uniformly and accurately from the radiation image storage panel. As a result, a radiation image having good image quality is capable of being obtained. Also, with the third radiation image storage panel in accordance with the present invention, non-deforming characteristics of the entire radiation image storage panel is kept by the rigid sheet, and therefore a particular rigid material need not be formed on the surface side of the phosphor layer, which surface side is opposite to the surface side provided with the rigid sheet. Accordingly, in cases where the irradiation of the radiation is performed from the surface side of the phosphor layer, which surface side is opposite to the surface side provided with the rigid sheet, the problems are capable of being prevented from occurring in that the radiation is absorbed by the rigid material, or the like, formed on the surface side of the phosphor layer, which surface side is opposite to the surface side provided with the rigid sheet. As a result, the image quality of the obtained radiation image is capable of being enhanced even further.

Therefore, the third radiation image storage panel in accordance with the present invention is appropriate for use in line scanning types of radiation image read-out apparatuses. In particular, the third radiation image storage panel in accordance with the present invention is capable of being employed advantageously in small-sized radiation image recording and reproducing systems having built-in radiation image storage panels and employing the technique, wherein the irradiation of the radiation to the radiation image storage panel is performed from one of two surface sides of the radiation image storage panel, and the readout of the radiation image, which has been stored on the radiation image storage panel when the radiation image storage panel is exposed to the radiation, is performed from the other surface side of the radiation image storage panel.

With the fourth radiation image storage panel in accordance with the present invention, the substrate of the radiation image storage panel is imparted with the rigidity and is formed as the rigid substrate, such that the gravity deflection quantity of the radiation image storage panel as a whole is set to be at most the predetermined value, and the horizontality of the radiation image storage panel is enhanced markedly. Therefore, the radiation image having been stored on the radiation image storage panel is capable of being read out uniformly and accurately from the radiation image storage panel. As a result, a radiation image having good image quality is capable of being obtained. Also, with the fourth radiation image storage panel in accordance with the present invention, the rigidity of the entire radiation image storage panel is kept by the rigid substrate, and therefore a particular rigid material need not be formed on the surface side of the phosphor layer, which surface side is opposite to the surface side provided with the rigid substrate. Further, the thickness of the protective layer formed on the surface of the phosphor layer, which surface is opposite to the surface side provided with the rigid substrate, is capable of being set to be thin regardless of the material constituting the protective layer. Accordingly, at the time of the readout of the radiation image from the radiation image storage panel, the efficiency, with which the radiation image storage panel is stimulated by the stimulating rays, and the efficiency, with which the light is emitted by the radiation image storage panel, are capable of being prevented from becoming low. As a result, the image quality of the obtained radiation image is capable of being enhanced even further.

Therefore, the fourth radiation image storage panel in accordance with the present invention is appropriate for use in line scanning types of radiation image read-out apparatuses. In particular, the fourth radiation image storage panel in accordance with the present invention is capable of being employed advantageously in the small-sized radiation image recording and reproducing systems having the built-in radiation image storage panels and employing the technique, wherein the irradiation of the radiation to the radiation image storage panel is performed from one of two surface sides of the radiation image storage panel, and the readout of the radiation image, which has been stored on the radiation image storage panel when the radiation image storage panel is exposed to the radiation, is performed from the other surface side of the radiation image storage panel.

BRIEF DESCRIPTION OF THE DRAWINGS

FIG. 1 is a sectional view showing a first embodiment of the radiation image storage panel in accordance with the present invention, FIG. 2 is a sectional view showing a second embodiment of the radiation image storage panel in accordance with the present invention, FIG. 3 is a sectional view showing a third embodiment of the radiation image storage panel in accordance with the present invention, FIG. 4 is a schematic view showing an example of a radiation image read-out apparatus, FIG. 7 is a schematic perspective view showing an example of a radiation image read-out apparatus, FIG. 15 is a schematic sectional view showing a sixth embodiment of the radiation image storage panel in accordance with the present invention.

DESCRIPTION OF THE PREFERRED EMBODIMENTS

Figure 5:
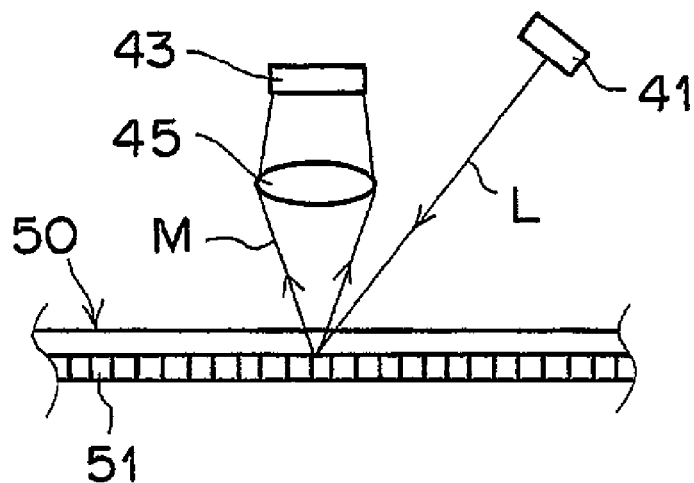
FIG. 5 is a schematic view showing how light emitted by a radiation image storage panel is collected in cases where a distance between a stimulating ray source and the radiation image storage panel and a distance between a converging lens and the radiation image storage panel are appropriate.

The present invention will hereinbelow be described in further detail with reference to the accompanying drawings.

FIG. 1 is a sectional view showing a first embodiment of the radiation image storage panel in accordance with the present invention. FIG. 2 is a sectional view showing a second embodiment of the radiation image storage panel in accordance with the present invention. FIG. 3 is a sectional view showing a third embodiment of the radiation image storage panel in accordance with the present invention.

With reference to FIG. 1, a radiation image storage panel 10, which acts as a first embodiment of the radiation image storage panel in accordance with the present invention, comprises a first rigid layer 12 and a stimulable phosphor layer 11, which is overlaid on the first rigid layer 12 with a vapor phase deposition technique. The radiation image storage panel 10 also comprises a filler layer 14 located between the first rigid layer 12, on which the stimulable phosphor layer 11 has been overlaid, and a second rigid layer 13. The filler layer 14 is located by adhesion between the first rigid layer 12, as well as the stimulable phosphor layer 11 having been overlaid on the first rigid layer 12, and the second rigid layer 13. Also, the density of the filler layer 14 is lower than the density of the first rigid layer 12 and the density of the second rigid layer 13. The first rigid layer 12 and the second rigid layer 13 may be constituted of an identical material. Alternatively, the first rigid layer 12 and the second rigid layer 13 may be constituted of different materials.

With reference to FIG. 2, a radiation image storage panel 20, which acts as a second embodiment of the radiation image storage panel in accordance with the present invention, comprises a first rigid layer 22, a second rigid layer 23, and a filler layer 24 sandwiched between the first rigid layer 22 and the second rigid layer 23. The radiation image storage panel 20 also comprises a substrate 25, a stimulable phosphor layer 21 overlaid on the substrate 25, and a protective layer 26 overlaid on the stimulable phosphor layer 21. (The structure comprising the substrate 25, the stimulable phosphor layer 21, and the protective layer 26 is identical with the structure of a conventional radiation image storage panel.) The structure comprising the substrate 25, the stimulable phosphor layer 21, and the protective layer 26, is located by adhesion on the structure comprising the first rigid layer 22, the filler layer 24, and the second rigid layer 23. In FIG. 2, the structure identical with the structure of the conventional radiation image storage panel is located by adhesion on the first rigid layer 22, and the stimulable phosphor layer 21 is overlaid on the first rigid layer 22 via the substrate 25. Alternatively, the stimulable phosphor layer 21 may be overlaid directly on the first rigid layer 22 without the substrate 25 intervening therebetween.

With reference to FIG. 3, a radiation image storage panel 30, which acts as a third embodiment of the radiation image storage panel in accordance with the present invention, comprises a first rigid layer 32 and a stimulable phosphor layer 31 overlaid on the first rigid layer 32 with the vapor phase deposition technique. The radiation image storage panel 30 also comprises a filler layer 34 located between the first rigid layer 32, on which the stimulable phosphor layer 31 has been overlaid, and a second rigid layer 33. The radiation image storage panel 30 further comprises a sealing member 37, which is formed between a peripheral region of the first rigid layer 32 and a peripheral region of the second rigid layer 33 so as to cover end faces of the filler layer 34.

In the radiation image storage panel 10 shown in FIG. 1 and the radiation image storage panel 30 shown in FIG. 3, the stimulable phosphor layer 11 and the stimulable phosphor layer 31 are formed with the vapor phase deposition technique. Alternatively, the stimulable phosphor layer may be formed with a coating technique. Also, in FIG. 1, FIG. 2, and FIG. 3, one radiation image storage panel comprises two rigid layers. Alternatively, one radiation image storage panel may comprise three or more rigid layers, and two or more filler layers may be formed, each of which is located between two adjacent rigid layers.

FIG. 4 is a schematic view showing an example of a radiation image read-out apparatus constituted such that the radiation image storage panel, on which a radiation image has been stored, is exposed to the stimulating rays, which cause the radiation image storage panel to emit light in proportion to the amount of energy stored thereon during its exposure to radiation, and the light emitted by the radiation image storage panel is collected through an optical lens onto light receiving means.

With reference to FIG. 4, a radiation image read-out apparatus A comprises a scanning belt 48 for supporting a radiation image storage panel 50, on which a radiation image has been stored, and conveying the radiation image storage panel 50 in the direction indicated by the arrow Y. The radiation image read-out apparatus A also comprises a broad area semiconductor laser (hereinbelow referred to as the BLD) 41 for radiating out linear stimulating rays L at an angle of approximately 45 degrees with respect to the surface of the radiation image storage panel 50. The radiation image read-out apparatus A further comprises an optical system 42, which is constituted of a combination of a collimator lens for collimating the linear stimulating rays L having been radiated out of the BLD 41 and a toric lens for expanding the beam only in one direction. The optical system 42 acts to irradiate the linear stimulating rays L onto the surface of the sheet 50. The radiation image read-out apparatus A still further comprises a converging lens 45 having an optical axis, which is approximately normal to the surface of the radiation image storage panel 50 and is inclined at an angle of approximately 45 degrees with respect to the direction of travel of the linear stimulating rays L. The converging lens 45 converges light M, which is emitted by the radiation image storage panel 50 when the radiation image storage panel 50 is exposed to the linear stimulating rays L, onto light receiving surfaces of photoelectric conversion devices 43, 43, . . . constituting a line sensor 44. The radiation image read-out apparatus A also comprises a stimulating ray cut-off filter 46 for transmitting only the emitted light M and filtering out the linear stimulating rays L, which are mixed slightly in the emitted light M impinging upon the converging lens 45. The radiation image read-out apparatus A further comprises the line sensor 44, which is constituted of the plurality of the photoelectric conversion devices 43, 43, . . . for receiving the emitted light M having passed through the stimulating ray cut-off filter 17 and for photoelectrically converting the emitted light M. The radiation image read-out apparatus A still further comprises image information reading means 47 for reading an output S of each of the photoelectric conversion devices 43, 43, . . . constituting the line sensor 44 and for feeding out an image signal, which has thus been obtained, into an image processing unit.

Figure 6:
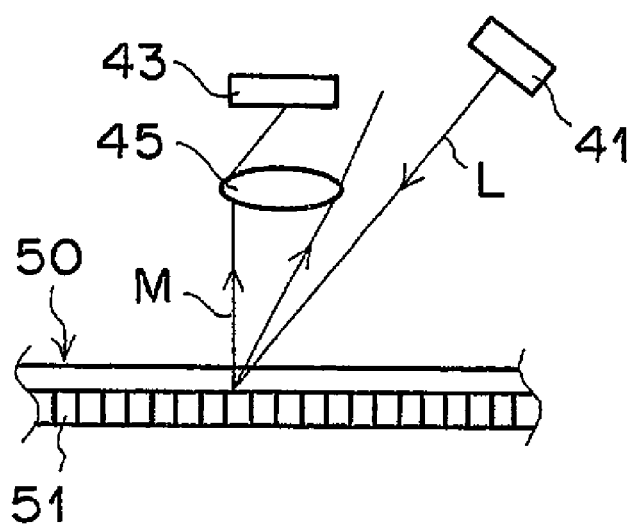
FIG. 6 is a schematic view showing how the light emitted by the radiation image storage panel is collected in cases where the distance between the stimulating ray source and the radiation image storage panel and the distance between the converging lens and the radiation image storage panel are longer than the appropriate distances.

FIG. 5 and FIG. 6 are enlarged views showing part of the radiation image read-out apparatus A of FIG. 4. As illustrated in FIG. 5, the linear stimulating rays L having been radiated out of the BLD 41 are irradiated to a stimulable phosphor layer 51 of the radiation image storage panel 50. The light M emitted from an exposed area of the stimulable phosphor layer 51 is converged by the converging lens 45 onto the photoelectric conversion devices 43, 43, . . . . In cases where the horizontality of the radiation image storage panel 50 is high, the irradiation of the linear stimulating rays L to the radiation image storage panel 50 and the convergence of the light M emitted by the radiation image storage panel 50 are performed in the state shown in FIG. 5.

However, as illustrated in FIG. 6, if the horizontality of the radiation image storage panel 50 is low, and the radiation image storage panel 50 becomes deflected, the distance between the BLD 41 for irradiating the linear stimulating rays L and the radiation image storage panel 50 will become long. In such cases, the position on the stimulable phosphor layer 51, which position is stimulated by the linear stimulating rays L, will shift from a correct position, and the light M will be emitted from the shifted position on the stimulable phosphor layer 51. Also, the distance between the radiation image storage panel 50 and the converging lens 45 will become long, and the quantity of the emitted light M, which is collected by the converging lens 45, will become small. As a result, a radiation image having good image quality cannot be obtained.

In particular, in order for the size of the radiation image read-out apparatus to be kept small, it is necessary that the irradiation of the radiation to the radiation image storage panel is performed from one of two surface sides of the radiation image storage panel, and the readout of the radiation image, which has been stored in the stimulable phosphor layer when the radiation image storage panel is exposed to the radiation, is performed from the other surface side of the radiation image storage panel. However, in such cases, such that the stimulating rays irradiated to the radiation image storage panel and the light emitted by the radiation image storage panel may not be blocked, the scanning belt for supporting and conveying the radiation image storage panel can be located only at two sides of the radiation image storage panel shown in FIG. 4 (i.e., at the two sides with respect to the direction indicated by the arrow Y). Therefore, in such cases, the radiation image storage panel is apt to deflect by gravity, and the aforesaid problems with regard to the shifting of the position, which is stimulated by the stimulating rays, and the reduction in quantity of the emitted light M, which is collected, are reinforced.

However, with the first, second, and third embodiments of the radiation image storage panel in accordance with the present invention, the filler layer, which has the density lower than the density of the first rigid layer and the density of the second rigid layer, is located by adhesion between the first rigid layer and the second rigid layer. The filler layer, the first rigid layer, and the second rigid layer are thus combined into an integral body. Therefore, with the first, second, and third embodiments of the radiation image storage panel in accordance with the present invention, the horizontality of the radiation image storage panel is capable of being enhanced, and a radiation image having good image quality is capable of being obtained from the radiation image storage panel.

Each of the first and second rigid layers and the filler layer will hereinbelow be described in detail.

Each of the first rigid layer and the second rigid layer utilized in the first, second, and third embodiments of the radiation image storage panel in accordance with the present invention is the layer having a modulus of elasticity of at least $1\times10^5$ (kgf/cm$^2$). Each of the first rigid layer and the second rigid layer should preferably have a modulus of elasticity ranging from $2\times10^5$ to $1\times10^8$ (kgf/cm$^2$). Each of the first rigid layer and the second rigid layer should more preferably be constituted of a material exhibiting little radiation absorption. Specifically, as the material for the rigid layer, a sheet-shaped rigid material, such as glass, a carbon fiber-reinforced plastic (CFRP) material, a glass fiber-reinforced plastic (GFRP) material, a metal exhibiting comparatively little radiation absorption (e.g., aluminum, a magnesium alloy, or beryllium), or a ceramic material, may be utilized.

Preferable examples of glass include FL0.7, FL0.85, and FL1.0 (supplied by Central Glass Co., Ltd.); UFF0.40, 0.50, 0.55, and 0.70 (supplied by Nippon Sheet Glass Co., Ltd.); and RRQS40SX (supplied by Asahi Glass Co., Ltd.).

The layer thickness of each of the rigid layers is set depending upon the number of the rigid layers formed, the kind of the rigid material utilized, and the layer thickness of the filler layer formed between the rigid layers. However, the total layer thickness of the rigid layers should preferably fall within the range of 100 μm to 10,000 μm, and should more preferably fall within the range of 1,000 μm to 5,000 μm. The layer thicknesses of the rigid layers need not necessarily be identical with each other and may be altered such that, for example, the layer thickness of the rigid layer, which is located close to the radiation irradiation side, is set to be thin, and the layer thickness of the rigid layer, which is located close to the image read-out side, is set to be thick.

The filler layer sandwiched between the rigid layers has a density lower than the density of each of the rigid layers and exhibits little absorption of radiation. The filler layer may be constituted of, for example, a non-woven fabric, a synthetic fiber, a natural fiber, a woven fabric of a synthetic fiber, a woven fabric of a natural fiber, or a glass fiber; a material having fine pores or voids, such as a foamed urethane, a foamed PET, a porous ceramic material, or a micro filter; an ordinary resin, particularly a resin having a density of at most 1.7, such as a polyethylene terephthalate, a polycarbonate, a polyurethane, an acrylic resin, or an epoxy resin; or a material comprising a binder and hollow particles (hollow polymer particles, or the like) mixed in the binder. In cases where the filler layer constituted of the material described above is utilized, the weight of the filler layer is capable of being kept light, and the radiation absorption of the filler layer is capable of being suppressed.

The layer thickness of the filler layer depends upon the number of the filler layers formed, the material of the filler constituting the filler layer, and the density of the filler constituting the filler layer. However, the total filler layer thickness should preferably fall within the range of 100 μm to 10,000 μm, and should more preferably fall within the range of 1,000 μm to 5,000 μm.

In cases where the filler is a material having no adhesive properties by itself, such as a fiber or a woven fabric, the filler is adhered to the rigid layers by use of an adhesive agent, or the like. The adhesive agent utilized in cases where the filler layer is formed between the two rigid layers should preferably be an adhesive agent having good airtight properties and a low moisture permeability. Preferable examples of the adhesive agents include organic high-molecular weight adhesive agents, such as an epoxy type of resin, a phenol type of resin, a cyano acrylate type of resin, a vinyl acetate type of resin, a vinyl chloride type of resin, a polyurethane type of resin, an acrylic type of resin, an ethylene-vinyl acetate type of resin, a polyolefin resin, a chloroprene type of rubber, and a nitrile type of rubber; and silicone types of adhesive agents. In cases where the filler is a material having the adhesive properties by itself, e.g. a resin capable of adhering to the rigid layers to form an integral body when the resin hardens, the adhesive agent need not be utilized.

Preferable examples of the binders for dispersing the hollow polymer particles therein include thermoplastic elastomers, such as a polystyrene, a polyolefin, a polyurethane, a polyester, a polyamide, a polybutadiene, an ethylene-vinyl acetate copolymer, a polyvinyl chloride, natural rubber, fluorine rubber, a polyisoprene, a chlorinated polyethylene, styrene-butadiene rubber, and silicon rubber.

The sealing member should preferably be constituted of a material having good airtight properties and a low moisture permeability. Preferable examples of the materials for the sealing member include the organic high-molecular weight adhesive agents enumerated above as the adhesive agents for adhering the filler layer to the rigid layers, and the silicone types of adhesive agents. The material for the sealing member should more preferably be the epoxy type of resin or the silicone type of adhesive agent, which exhibits good moisture-proof properties. Also, as the material for the sealing member, besides the adhesive agents described above, a sealing glass, such as a low melting temperature glass, may be utilized. The sealing member may thus be formed through glass fusion.

The stimulable phosphor, which constitutes the stimulable phosphor layer in each of the aforesaid first, second, and third embodiments of the radiation image storage panel in accordance with the present invention, has the properties such that, when the stimulable phosphor is caused to absorb radiation and is then exposed to stimulating rays, the stimulable phosphor emits light in proportion to the amount of energy stored thereon during its exposure to the radiation. From the practical aspect, the stimulable phosphor should preferably have the characteristics such that, when the stimulable phosphor is exposed to the stimulating rays having wavelengths falling within the range of 400 nm to 900 nm, the stimulable phosphor emits light having wavelengths falling within the range of 300 nm to 500 nm. No limitation is imposed upon the stimulable phosphor employed in the first, second, and third embodiments of the radiation image storage panel in accordance with the present invention. However, from the view point of the luminance of the light emitted by the stimulable phosphor, the stimulable phosphor should preferably be, for example, a stimulable phosphor represented by the formula $(M_{1-f}M^I_f)X.bM^{III}X''_3$:cA wherein $M^I$ should preferably be at least one kind of alkali metal selected from the group consisting of Rb, Cs and/or Cs-containing Na, and Cs-containing K, particularly at least one kind of alkali metal selected from the group consisting of Rb and Cs, $M^{III}$ should preferably be at least one kind of trivalent metal selected from the group consisting of Y, La, Lu, Al, Ga, and In, X" should preferably be at least one kind of halogen selected from the group consisting of F, Cl, and Br, the value of b representing the content of $M^{III}X''_3$ should preferably be selected from the range of $0 \leq b \leq 10^{-2}$, A acting as the activator should preferably be at least one kind of metal selected from the group consisting of Eu, Tb, Ce, Tm, Dy, Ho, Gd, Sm, Tl, and Na, particularly at least one kind of metal selected from the group consisting of Eu, Ce, Sm, Tl, and Na, and the value of c representing the quantity of the activator is selected from the range of $10^{-6} < c < 0.1$, as described in Japanese Patent Publication No. 7(1995)-84588.

Examples of the other stimulable phosphors, which may also be employed in the first, second, and third embodiments of the radiation image storage panel in accordance with the present invention, include the following:

a phosphor represented by the formula SrS:Ce,Sm; SrS:Eu,Sm; ThO$_2$:Er; or La$_2$O$_2$S:Eu,Sm, as described in U.S. Pat. No. 3,859,527, a phosphor represented by the formula ZnS:Cu,Pb; BaO.xAl$_2$O$_3$:Eu wherein $0.8 \leq x \leq 10$; $M^{II}$O.xSiO$_2$:A wherein $M^{II}$ is Mg, Ca, Sr, Zn, Cd, or Ba, A is Ce, Tb, Eu, Tm, Pb, Tl, Bi, or Mn, and x is a number satisfying $0.5 \leq x \leq 2.5$; or LnOX:xA wherein Ln is at least one of La, Y, Gd, and Lu, X is at least one of Cl and Br, A is at least one of Ce and Tb, x is a number satisfying $0 < x < 0.1$, as disclosed in U.S. Pat. No. 4,236,078, a phosphor represented by the formula $(Ba_{1-x-y},Mg_x,Ca_y)$FX:aEU$^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$, as disclosed in DE-OS No. 2,928,245, a phosphor represented by the formula $(Ba_{1-x},M^{2+}_x)$FX:yA wherein $M^{2+}$ is at least one of Mg, Ca, Sr, Zn, and Cd, X is at least one of Cl, Br, and I, A is at least one of Eu, Tb, Ce, Tm, Dy, Pr, Ho, Nd, Yb, and Er, x is a number satisfying $0 \leq x \leq 0.6$, and y is a number satisfying $0 \leq y \leq 0.2$, as disclosed in U.S. Pat. No. 4,239,968, a phosphor represented by the formula $M^{II}$FX.xA:yLn wherein $M^{II}$ is at least one of Ba, Ca, Sr, Mg, Zn, and Cd, A is at least one of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, ThO$_2$, Ln is at least one of Eu, Tb, Ce, Tm, Dy, Pr, Ho, Nd, Yb, Er, Sm, and Gd, X is at least one of Cl, Br, and I, x is a number satisfying $5 \times 10^{-5} \leq x \leq 0.5$, and y is a number satisfying $0 < y \leq 0.2$, as described in Japanese Unexamined Patent Publication No. 55(1980)-160078, a phosphor represented by the formula $(Ba_{1-x},M^{II}_x)$F$_2$.aBaX$_2$:yEu,zA wherein $M^{II}$ is at least one of beryllium, magnesium, calcium, strontium, zinc, and cadmium, X is at least one of chlorine, bromine, and iodine, A is at least one of zirconium and scandium, a is a number satisfying $0.5 \leq a \leq 1.25$, x is a number satisfying $0 \leq x \leq 1$, y is a number satisfying $10^{-6} \leq y \leq 2 \times 10^{-1}$, and z is a number satisfying $0 < z \leq 10^{-2}$, as described in Japanese Unexamined Patent Publication No. 56(1981)-116777, a phosphor represented by the formula $(Ba_{1-x},M^{II}_x)$F$_2$.aBaX$_2$:yEu,zB wherein $M^{II}$ is at least one of beryllium, magnesium, calcium, strontium, zinc, and cadmium, X is at least one of chlorine, bromine, and iodine, a is a number satisfying $0.5 \leq a \leq 1.25$, x is a number satisfying $0 \leq x \leq 1$, y is a number satisfying $10^{-6} \leq y \leq 2 \times 10^{-1}$, and z is a number satisfying $0 < z \leq 10^{-2}$, as described in Japanese Unexamined Patent Publication No. 57(1982)-23673, a phosphor represented by the formula $(Ba_{1-x},M^{II}_x)$F$_2$.aBaX$_2$:yEu,zA wherein $M^{II}$ is at least one of beryllium, magnesium, calcium, strontium, zinc, and cadmium, X is at least one of chlorine, bromine, and iodine, A is at least one of arsenic and silicon, a is a number satisfying $0.5 \leq a \leq 1.25$, x is a number satisfying $0 \leq x \leq 1$, y is a number satisfying $10^{-6} \leq y \leq 2 \times 10^{-1}$, and z is a number satisfying $0 < z \leq 5 \times 10^{-1}$, as described in Japanese Unexamined Patent Publication No. 57(1982)-23675, a phosphor represented by the formula $M^{III}$OX:xCe wherein $M^{III}$ is at least one trivalent metal selected from the group consisting of Pr, Nd, Pm, Sm, Eu, Tb, Dy, Ho, Er, Tm, Yb, and Bi, X is either one or both of Cl and Br, and x is a number satisfying $0 < x < 0.1$, as described in Japanese Unexamined Patent Publication No. 58(1983)-69281, a phosphor represented by the formula Ba$_{1-x}$M$_{x/2}$L$_{x/2}$FX:yEu$^{2+}$ wherein M is at least one alkaline metal selected from the group consisting of Li, Na, K, Rb, and Cs, L is at least one trivalent metal selected from the group consisting of Sc, Y, La, Ce, Pr, Nd, Pm, Sm, Gd, Tb, Dy, Ho, Er, Tm, Yb, Lu, Al, Ga, In, and Tl, X is at least one halogen selected from the group consisting of Cl, Br, and I, x is a number satisfying $10^{-2} \leq x \leq 0.5$, and y is a number satisfying $0 < y \leq 0.1$, as described in Japanese Unexamined Patent Publication No. 58(1983)-206678, a phosphor represented by the formula BaFX.xA:yEu$^{2+}$ wherein X is at least one halogen selected from the group consisting of Cl, Br, and I, A is a calcination product of a tetrafluoro boric acid compound, x is a number satisfying $10^{-6} \leq x \leq 0.1$, and y is a number satisfying $0 < y \leq 0.1$, as described in Japanese Unexamined Patent Publication No. 59(1984)-27980, a phosphor represented by the formula BaFX.xA:yEu$^{2-}$ wherein X is at least one halogen selected from the group consisting of Cl, Br, and I, A is a calcination product of at least one compound selected from the hexafluoro compound group consisting of salts of hexafluoro silicic acid, hexafluoro titanic acid, and hexafluoro zirconic acid with monovalent or bivalent metals, x is a number satisfying $10^{-6} \leq x \leq 0.1$, and y is a number satisfying $0 < y \leq 0.1$, as described in Japanese Unexamined Patent Publication No. 59(1984)-47289, a phosphor represented by the formula BaFX.xNaX':aEu$^{2+}$ wherein each of X and X' is at least one of Cl, Br, and I, x is a number satisfying $0 < x \leq 2$, and a is a number satisfying $0 < a \leq 0.2$, as described in Japanese Unexamined Patent Publication No. 59(1984)-56479, a phosphor represented by the formula $M^{II}$FX.xNaX':yEu$^{2+}$:zA wherein $M^{II}$ is at least one alkaline earth metal selected from the group consisting of Ba, Sr, and Ca, each of X and X' is at least one halogen selected from the group consisting of Cl, Br, and I, A is at least one transition metal selected from the group consisting of V, Cr, Mn, Fe, Co, and Ni, x is a number satisfying $0<x\leq 2$, y is a number satisfying $0<y\leq 0.2$, and z is a number satisfying $0<z\leq 10^{-2}$, as described in Japanese Unexamined Patent Publication No. 59(1984)-56480, a phosphor represented by the formula $M^{II}FX \cdot aM^{I}X' \cdot bM^{II}X''_2 \cdot cM^{III}X'''_3 \cdot xA:yEu^{2+}$ wherein $M^{II}$ is at least one alkaline earth metal selected from the group consisting of Ba, Sr, and Ca, $M^{I}$ is at least one alkali metal selected from the group consisting of Li, Na, K, Rb, and Cs, $M^{II}$ is at least one bivalent metal selected from the group consisting of Be and Mg, $M^{III}$ is at least one trivalent metal selected from the group consisting of Al, Ga, In, and Tl, A is a metal oxide, X is at least one halogen selected from the group consisting of Cl, Br, and I, each of X', X", and X'" is at least one halogen selected from the group consisting of F, Cl, Br, and I, a is a number satisfying $0\leq a\leq 2$, b is a number satisfying $0\leq b\leq 10^{-2}$, c is a number satisfying $0\leq c\leq 10^{-2}$, and $a+b+c\geq 10^{-6}$, x is a number satisfying $0<x\leq 0.5$, and y is a number satisfying $0<y\leq 0.2$, as described in Japanese Unexamined Patent Publication No. 59(1984)-75200, a stimulable phosphor represented by the formula $M^{II}X_2 \cdot aM^{II}X'_2:xEu^{2+}$ wherein $M^{II}$ is at least one alkaline earth metal selected from the group consisting of Ba, Sr, and Ca, each of X and X' is at least one halogen selected from the group consisting of Cl, Br, and I, and $X\neq X'$, a is a number satisfying $0.1\leq a\leq 10.0$, and x is a number satisfying $0<x\leq 0.2$, as described in Japanese Unexamined Patent Publication No. 60(1985)-84381, a stimulable phosphor represented by the formula $M^{II}FX \cdot aM^{I}X':xEu^{2+}$ wherein $M^{II}$ is at least one alkaline earth metal selected from the group consisting of Ba, Sr, and Ca, $M^{I}$ is at least one alkali metal selected from the group consisting of Rb and Cs, X is at least one halogen selected from the group consisting of Cl, Br, and I, X' is at least one halogen selected from the group consisting of F, Cl, Br, and I, a is a number satisfying $0\leq a\leq 4.0$, and x is a number satisfying $0<x\leq 0.2$; or a stimulable phosphor represented by the formula $M^{I}X:xEu^{2+}$ wherein $M^{I}$ is one kind of alkali metal, X is one kind of halogen, and x is a number satisfying $0<x\leq 0.2$, as described in Japanese Unexamined Patent Publication No. 60(1985)-101173, a stimulable phosphor represented by the formula $M^{I}X:xBi$ wherein $M^{I}$ is at least one alkali metal selected from the group consisting of Rb and Cs, X is at least one halogen selected from the group consisting of Cl, Br, and I, and x is a number falling within the range of $0<x\leq 0.2$, as described in Japanese Unexamined Patent Publication No. 62(1987)-25189, and a cerium activated rare earth element oxyhalide phosphor represented by the formula LnOX:xCe wherein Ln is at least one of La, Y, Gd, and Lu, X is at least one of Cl, Br, and I, x is a number satisfying $0<x\leq 0.2$, the ratio of X to Ln, expressed in terms of the atomic ratio, falls within the range of $0.500<X/Ln\leq 0.998$, and a maximum wavelength $\lambda$ of the stimulation spectrum falls within the range of 550 nm$<\lambda<$700 nm, as described in Japanese Unexamined Patent Publication No. 2(1990)-229882.

The stimulable phosphor represented by the formula $M^{II}X_2 \cdot aM^{II}X'_2:xEu^{2+}$, which is described in Japanese Unexamined Patent Publication No. 60(1985)-84381, may contain the additives described below in the below-mentioned proportions per mol of $M^{II}X_2 \cdot aM^{II}X'_2$:

$bM^{I}X''$ wherein $M^{I}$ is at least one alkali metal selected from the group consisting of Rb and Cs, X" is at least one halogen selected from the group consisting of F, Cl, Br, and I, and b is a number satisfying $0<b\leq 10.0$, as described in Japanese Unexamined Patent Publication No. 60(1985)-166379, $bKX'' \cdot cMgX_2 \cdot dM^{III}X'_3$ wherein $M^{III}$ is at least one trivalent metal selected from the group consisting of Sc, Y, La, Gd, and Lu, each of X", X, and X' is at least one halogen selected from the group consisting of F, Cl, Br, and I, b is a number satisfying $0\leq b\leq 2.0$, c is a number satisfying $0\leq c\leq 2.0$, d is a number satisfying $0\leq d\leq 2.0$, and $2\times 10^{-5}\leq b+c+d$, as described in Japanese Unexamined Patent Publication No. 60(1985)-221483, yB wherein y is a number satisfying $2\times 10^{-4}\leq y\leq 2\times 10^{-1}$, as described in Japanese Unexamined Patent Publication No. 60(1985)-228592, bA wherein A is at least one oxide selected from the group consisting of $SiO_2$ and $P_2O_5$, and b is a number satisfying $10^{-4}\leq b\leq 2\times 10^{-1}$, as described in Japanese Unexamined Patent Publication No. 60(1985)-228593, bSiO wherein b is a number satisfying $0<b\leq 3\times 10^{-2}$, as described in Japanese Unexamined Patent Publication No. 61(1986)-120883, $bSnX''_2$ wherein X" is at least one halogen selected from the group consisting of F, Cl, Br, and I, and b is a number satisfying $0<b\leq 10^{-3}$, as described in Japanese Unexamined Patent Publication No. 61(1986)-120885, $bCsX'' \cdot cSnX_2$ wherein each of X" and X is at least one halogen selected from the group consisting of F, Cl, Br, and I, b is a number satisfying $0<b\leq 10.0$, and c is a number satisfying $10^{-6}\leq c\leq 2\times 10^{-2}$, as described in Japanese Unexamined Patent Publication No. 61(1986)-235486, and $bCsX'' \cdot yLn^{3+}$ wherein X" is at least one halogen selected from the group consisting of F, Cl, Br, and I, Ln is at least one rare earth element selected from the group consisting of Sc, Y, Ce, Pr, Nd, Sm, Gd, Tb, Dy, Ho, Er, Tm, Yb, and Lu, b is a number satisfying $0<b\leq 10.0$, and y is a number satisfying $10^{-6}\leq y\leq 1.8\times 10^{-1}$, as described in Japanese Unexamined Patent Publication No. 61(1986)-235487.

However, the stimulable phosphor employed in the first, second, and third embodiments of the radiation image storage panel in accordance with the present invention is not limited to those enumerated above and may be one of various stimulable phosphors having the properties such that, when the stimulable phosphor is caused to absorb radiation and is then exposed to the stimulating rays, the stimulable phosphor emits light in proportion to the amount of energy stored thereon during its exposure to the radiation.

How the radiation image storage panel is produced will be described hereinbelow by taking the radiation image storage panel 30 shown in FIG. 3 as an example.

Firstly, the stimulable phosphor layer is overlaid on one of the rigid layers. The stimulable phosphor layer may be overlaid on the rigid layer with a known vapor phase deposition technique, such as a vacuum evaporation technique or a sputtering technique, or with a coating technique. In this example, how the stimulable phosphor layer is overlaid on the rigid layer with the vapor phase deposition technique will be described hereinbelow.

With the vacuum evaporation technique, the rigid layer is located within a vacuum evaporation apparatus, and the vacuum evaporation apparatus is then evacuated to a degree of vacuum of approximately $10^{-4}$ Pa. Thereafter, at least one kind of stimulable phosphor is heated and evaporated with a resistance heating technique, an electron beam technique, or the like, and a layer of the stimulable phosphor is deposited to a desired thickness on the surface of the rigid layer. In this manner, the stimulable phosphor layer containing no binder is capable of being formed on the rigid layer.

The vacuum evaporation process may be performed in a plurality of stages in order to form the stimulable phosphor layer. Also, in the vacuum evaporation process, a plurality of constituents for a desired stimulable phosphor may be co-evaporated by use of a plurality of resistance heaters or a plurality of electron beams. In this manner, the desired stimulable phosphor may be synthesized on the rigid layer, and the stimulable phosphor layer may thereby be formed on the rigid layer.

With the sputtering technique, in the same manner as that in the vacuum evaporation technique, the rigid layer is located within a sputtering apparatus, and the sputtering apparatus is then evacuated to a degree of vacuum of approximately $10^{-4}$ Pa. Thereafter, an inert gas, such as an Ar gas or a Ne gas, acting as the gas for the sputtering is introduced into the sputtering apparatus, and the gas pressure in the sputtering apparatus is set at approximately $10^{-1}$ Pa.

Thereafter, sputtering is performed with the stimulable phosphor set as a target, and the stimulable phosphor is thereby deposited to a desired thickness on the surface of the rigid layer. As in the cases of the vacuum evaporation process, the sputtering process may be performed in a plurality of stages in order to form the stimulable phosphor layer on the rigid layer. Also, a plurality of targets constituted of different stimulable phosphors may be utilized and simultaneously or successively subjected to the sputtering in order to form the stimulable phosphor layer. Further, in the sputtering technique, when necessary, a gas, such as an $O_2$ gas, an $H_2$ gas, or a halogen gas, may be introduced into the sputtering apparatus, and a reactive sputtering process may thereby be performed.

After the stimulable phosphor layer has been overlaid on the rigid layer with the vacuum evaporation technique or the sputtering technique, the sealing member is located on the area of the rigid layer, which area is not covered by the stimulable phosphor layer, i.e. on the area of the rigid layer outward from the periphery of the stimulable phosphor layer overlaid on the rigid layer. In cases where the filler itself has no adhesive properties, the filler is adhered with an adhesive agent to the rigid layer, and the filler layer is thereby formed. Thereafter, the other rigid layer is adhered to the filler layer by use of an adhesive agent. In this manner, the radiation image storage panel is produced.

In cases where the filler has the adhesive properties, the radiation image storage panel may be produced with the same technique as that employed in the cases where the filler has no the adhesive properties. Alternatively, the radiation image storage panel may be produced with a technique, wherein the rigid layer, on which the sealing member has been located, and the other rigid layer are located to stand facing each other and adhered to each other, the filler is poured into the space formed between the two rigid layers and hardened, and the region, through which the filler has been poured, is finally sealed with the sealing member.

In order for the sharpness of the obtained image to be enhanced, the filler layer constituting the first, second, and third embodiments of the radiation image storage panel in accordance with the present invention may be colored with a coloring agent, which is capable of absorbing only the stimulating rays and does not absorb the light emitted by the stimulable phosphor layer. (The coloring agent is described in, for example, Japanese Patent Publication No. 54(1979)-23400.)

The radiation image storage panel, in which the stimulable phosphor layer is overlaid with the vacuum evaporation on one of the two rigid layers, is produced in the manner described above. The radiation image storage panel, such as the radiation image storage panel shown in FIG. 2, in which the structure identical with the structure of the conventional radiation image storage panel is located on the structure comprising the rigid layers and the filler layer sandwiched between the rigid layers, may be produced with the same technique as that described above.

The present invention will further be illustrated by the following non-limitative examples.

EXAMPLE 1

A 700 μm-thick quartz glass plate (having a modulus of elasticity of $7 \times 10^5$ kgf/cm$^2$) acting as a rigid layer was located within a vacuum evaporation apparatus. An alkali halide stimulable phosphor (CsBr:0.01Eu) was then placed in a platinum boat in the vacuum evaporation apparatus, and the vacuum evaporation apparatus was evacuated to a degree of vacuum of $2 \times 10^{-4}$ Pa. Thereafter, an electron beam at an accelerating voltage of 2.3 kV was irradiated from an electron gun to the stimulable phosphor, which was placed in the platinum boat, for 30 minutes, and the stimulable phosphor was thereby deposited on the quartz glass plate at a rate of 30 μm/minute. After the deposition, the irradiation of the electron beam was ceased, the pressure within the vacuum evaporation apparatus was returned to the atmospheric pressure, and the quartz glass plate was taken out of the vacuum evaporation apparatus. It was observed that the acicular stimulable phosphor having a thickness of 20 μm and a length of 900 μm was densely deposited in an erect orientation on the quartz glass plate.

Thereafter, a polyethylene, in which silica gel was encapsulated, (Hisheet Dry, supplied by Marutani Kakoki, K. K., equilibrium hygroscopic degree at 25° C., 80% RH: 3.3%) was located as a hygroscopic material on an area of the rigid layer, which area was not covered by the stimulable phosphor layer, i.e. on the area of the rigid layer outward from the periphery of the stimulable phosphor layer overlaid on the rigid layer. A micro polymer sheet (PORPN:RIC, supplied by Rogers Inoac Co., thickness: 2,000 μm, density: 0.5 g/cm$^3$) acting as a filler layer was adhered to the stimulable phosphor layer by use of a polyurethane type of adhesive agent (T-600, supplied by Nippon Soda Co., Ltd.). A 700 μm-thick quartz glass plate (having a modulus of elasticity of $7 \times 10^5$ kgf/cm$^2$) acting as the other rigid layer was then located on the micro polymer sheet, which had been adhered to the stimulable phosphor layer. The quartz glass plate acting as the other rigid layer was adhered to the micro polymer sheet by use of a polyurethane type of adhesive agent. In this manner, a radiation image storage panel was formed.

EXAMPLE 2

A 700 μm-thick quartz glass plate (having a modulus of elasticity of $7 \times 10^5$ kgf/cm$^2$) acting as a rigid layer was located within a vacuum evaporation apparatus. An alkali halide stimulable phosphor (CsBr:0.01Eu) was then placed in a platinum boat in the vacuum evaporation apparatus, and the vacuum evaporation apparatus was evacuated to a degree of vacuum of $2 \times 10^{-4}$ Pa. Thereafter, an electron beam at an accelerating voltage of 2.3 kV was irradiated from an electron gun to the stimulable phosphor, which was placed in the platinum boat, for 30 minutes, and the stimulable phosphor was thereby deposited on the quartz glass plate at a rate of 30 μm/minute. After the deposition, the irradiation of the electron beam was ceased, the pressure within the vacuum evaporation apparatus was returned to the atmospheric pressure, and the quartz glass plate was taken out of the vacuum evaporation apparatus.

Thereafter, quartz glass rods acting as a sealing member were located by adhesion through glass fusion on the side of the rigid layer, on which side the stimulable phosphor layer had been overlaid. Specifically, the sealing member was located at the area of the rigid layer outward from the periphery of the stimulable phosphor layer overlaid on the rigid layer, except for an area of the rigid layer corresponding to one side of the periphery of the stimulable phosphor layer. A different rigid layer (i.e., a 1,000 μm-thick carbon FRP having a modulus of elasticity of $5 \times 10^6$ kgf/cm$^2$) was then located to stand facing the aforesaid rigid layer, on which the sealing member had been located. The different rigid layer was adhered to the sealing member, which had been located on the aforesaid rigid layer, by use of an epoxy resin. Thereafter, a thermosetting epoxy resin (Cemedine RP1001, supplied by Cemedine K. K., density: 1.2 g/cm$^3$) was poured into the space, which had been formed between the two rigid layers, and a filler layer was thereby formed. Finally, a quartz glass acting as the sealing member was located by adhesion through glass fusion at the area of the rigid layer corresponding to the one side of the periphery of the stimulable phosphor layer, at which one side the sealing member had not been located. In this manner, a radiation image storage panel was formed.

Each of the radiation image storage panels formed in Example 1 and Example 2 in accordance with the present invention had a weight approximately identical with the weight of a conventional radiation image storage panel and exhibited less deflection than the conventional radiation image storage panel. Therefore, with each of the radiation image storage panels formed in Example 1 and Example 2 in accordance with the present invention, the horizontality of the radiation image storage panel was capable of being kept high, the efficiency, with which the light emitted by the radiation image storage panel was collected, was capable of being kept high, and radiation absorption was capable of being suppressed. Accordingly, an image having good image quality was capable of being obtained.

Fourth, fifth, and sixth embodiments of the radiation image storage panel in accordance with the present invention will be described hereinbelow.

Figure 8:
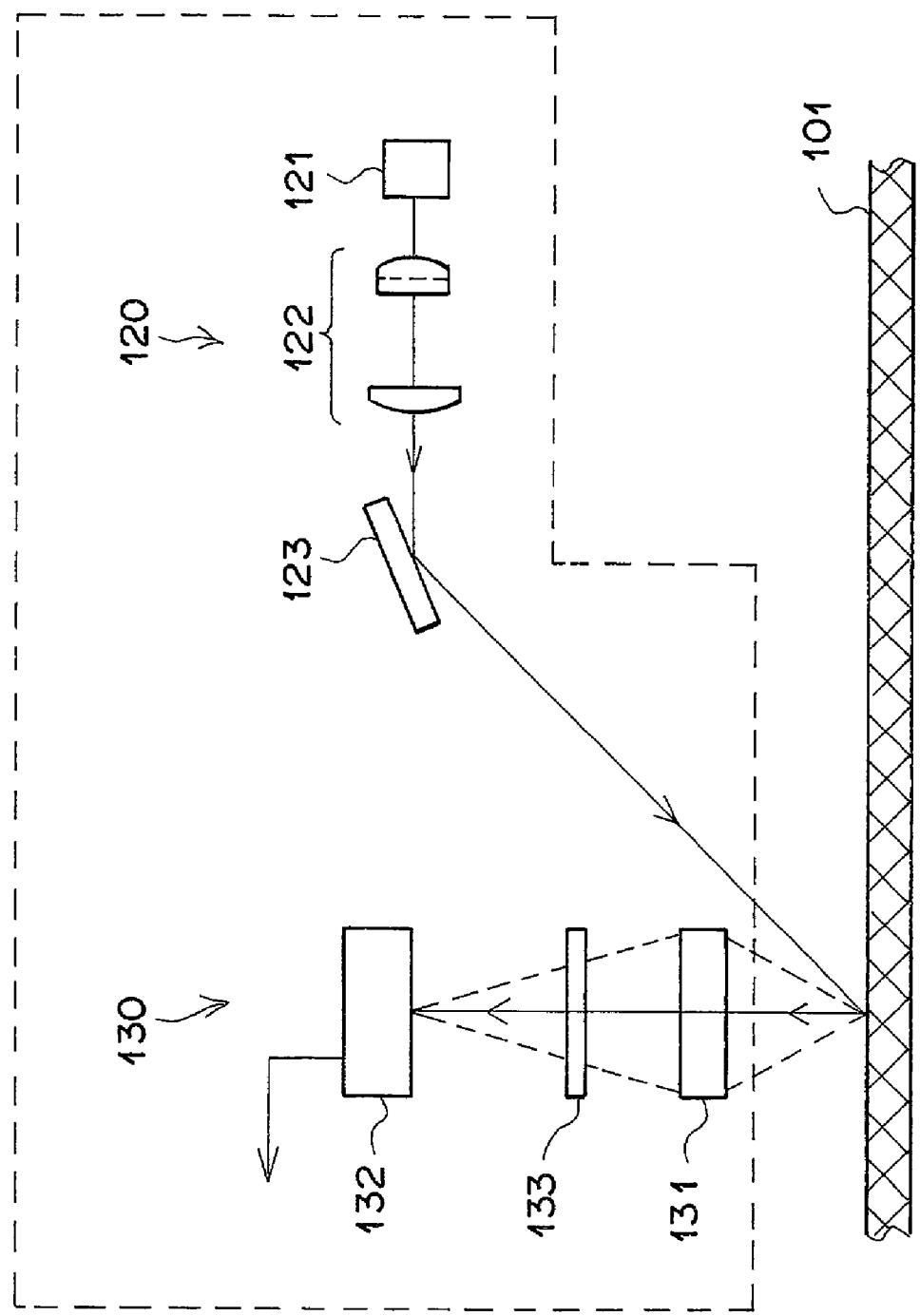
FIG. 8 is a schematic sectional view showing the radiation image read-out apparatus of FIG. 7.

FIG. 7 is a schematic perspective view showing an example of a radiation image read-out apparatus. FIG. 8 is a schematic sectional view showing the radiation image read-out apparatus of FIG. 7. In FIG. 7 and FIG. 8, the radiation image read-out apparatus comprises supporting means (not shown) for horizontally securing and supporting a radiation image storage panel 101, on which a radiation image has been stored. The radiation image read-out apparatus also comprises irradiation means 120 for irradiating the stimulating rays to the radiation image storage panel 101. The radiation image read-out apparatus further comprises detection means 130 for detecting the light emitted by the radiation image storage panel 101 when the radiation image storage panel 101 is exposed to the stimulating rays. The radiation image read-out apparatus still further comprises conveyance means (not shown) for moving the irradiation means 120 and the detection means 130 together in the direction indicated by the arrow Y.

As described above, in the radiation image read-out apparatus, the radiation image storage panel 101 is secured and horizontally held by the supporting means. The stimulating rays are produced by a broad area laser 121 of the irradiation means 120. The stimulating rays, which have been produced by the broad area laser 121, pass through a light converging optical system 122 constituted of a toric lens, and the like, and are reflected by a reflecting mirror 123. In this manner, the stimulating rays are converged onto a linear area extending in the direction indicated by the arrow X on the surface of the radiation image storage panel 101. As a result, the light is linearly emitted from the surface of the radiation image storage panel 101. The light, which has been emitted by the radiation image storage panel 101, passes through an image forming lens 131 of the detection means 130, and the image of the emitted light is formed on a line sensor 132. The emitted light is photoelectrically converted by the line sensor 132 into an electric image signal. The line sensor 132 comprises a plurality of photoelectric conversion devices arrayed in the direction indicated by the arrow X. The stimulating rays, which are mixed slightly in the emitted light, are filtered out by a stimulating ray cut-off filter 133. The irradiation means 120 and the detection means 130, which are combined together, are moved by the conveyance means in the direction indicated by the arrow Y, while the irradiation means 120 is performing the irradiation of the stimulating rays onto the radiation image storage panel 101 and the detection means 130 is performing the detection of the light emitted by the radiation image storage panel 101. In this manner, the radiation image having been stored on the radiation image storage panel 101 is read out.

With the line scanning read-out technique described above, the distributed index lens array, or the like, is utilized as the image forming lens 131. However, the allowance range (the range, in which the image formation relationship for the formation of the image on the line sensor 132 through the image forming lens 131 obtains, i.e. the focal depth) of the image forming lens 131 with respect to the lowering of the horizontality of the radiation image storage panel 101 is narrow. If the horizontality of the radiation image storage panel 101 is outside of the allowance range of the image forming lens 131, the collected light quantity will decrease due to, for example, a shift of the point, upon which the stimulating rays impinge, and the image quality of the image reproduced from the image signal detected from the radiation image storage panel 101 will be caused to become bad.

Figure 9:
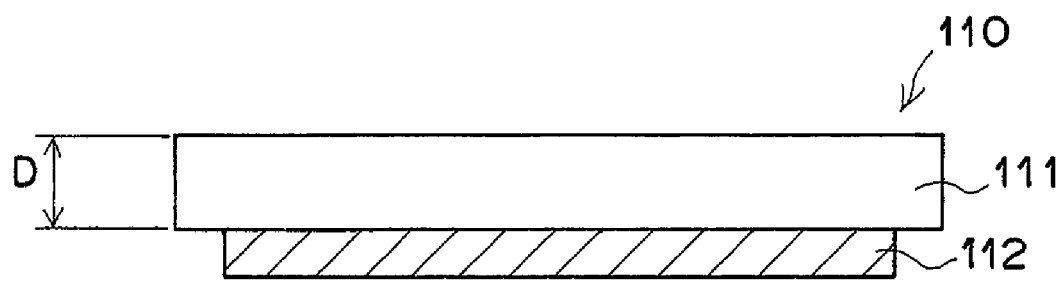
FIG. 9 is a schematic sectional view showing a fourth embodiment of the radiation image storage panel in accordance with the present invention.

FIG. 9 is a schematic sectional view showing a fourth embodiment of the radiation image storage panel in accordance with the present invention.

As illustrated in FIG. 9, a radiation image storage panel 110, which acts as a fourth embodiment of the radiation image storage panel in accordance with the present invention, comprises a rigid sheet 111 and a phosphor layer (in this case, a stimulable phosphor layer) 112 overlaid on the rigid sheet 111. The stimulable phosphor layer 112 is overlaid directly on an area of the surface of the rigid sheet 111, which area is positioned more inward than the peripheral ends of the rigid sheet 111.

Figure 10:
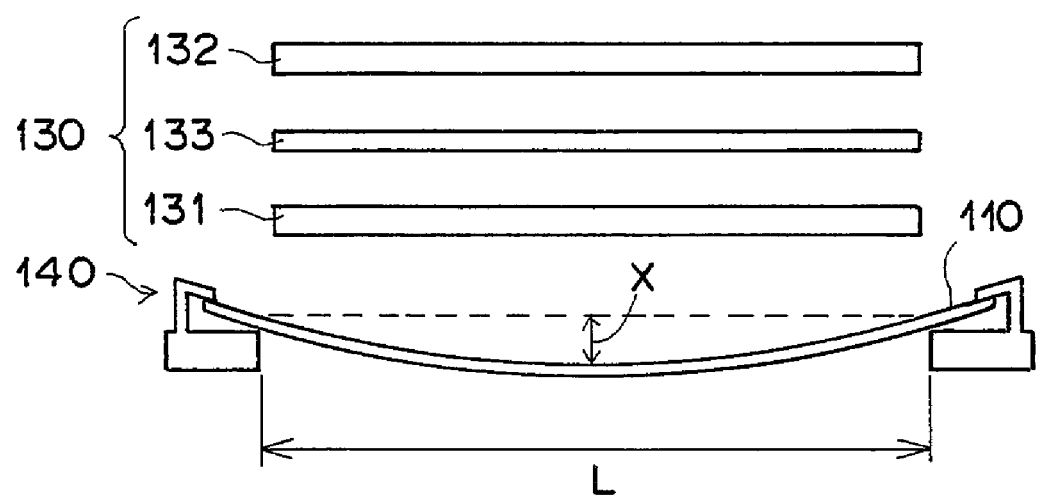
FIG. 10 is a schematic sectional view showing an example of a mechanism for securing and supporting two sides of the radiation image storage panel, which two sides stand facing each other.

In the fourth embodiment of the radiation image storage panel in accordance with the present invention, the radiation image storage panel 110 is set such that a deflection quantity X of the radiation image storage panel 110, which deflection quantity occurs when, as illustrated in FIG. 10, the radiation image storage panel 110 is secured and supported at two sides of the radiation image storage panel 110, the two sides standing to face each other, and the radiation image storage panel 110 is thus held horizontally, is at most 1,000 μm. The deflection quantity X of the radiation image storage panel 110 should preferably be at most 500 μm, and should more preferably be at most 200 μm.

FIG. 10 is a schematic sectional view showing an example of a mechanism for securing and supporting two sides of the radiation image storage panel, which two sides stand facing each other, in a radiation image read-out apparatus. With reference to FIG. 10, end portions at the two sides of the radiation image storage panel 110, which two sides stand facing each other, are secured and supported by supporting means 140, and the radiation image storage panel 110 is thus held horizontally with the side of the rigid sheet 111 facing up. Ordinarily, the end portions at the two sides of the radiation image storage panel 110, which two sides extend in the longitudinal direction of the radiation image storage panel 110, are secured and supported by the supporting means 140. As illustrated in FIG. 9, the stimulable phosphor layer 112 of the radiation image storage panel 110 is overlaid on the area of the surface of the rigid sheet 111, which area is positioned more inward than the peripheral ends of the rigid sheet 111. Therefore, only an area of the rigid sheet 111, which area is not covered by the stimulable phosphor layer 112, i.e. only the area of the rigid sheet 111 outward from the periphery of the stimulable phosphor layer 112, is grasped and secured by the supporting means 140. Also, as illustrated in FIG. 10, the detection means 130 (comprising the image forming lens 131, the line sensor 132, and the stimulating ray cut-off filter 133) is located above the radiation image storage panel 110. The detection means 130 is capable of being moved in the direction normal to the plane of the sheet of FIG. 10.

The term "deflection quantity X" as used herein means the maximum value of the deflection. Ordinarily, the deflection quantity X is the deflection quantity at the center position of the radiation image storage panel 110. In cases where the deflection quantity X of the radiation image storage panel 110 is suppressed to be at most 1,000 µm, the image of the light emitted from the entire image recording region of the stimulable phosphor layer 112 of the radiation image storage panel 110, on which region the radiation image is capable of being stored, is capable of being formed on the line sensor 132 via the image forming lens 131. Therefore, the radiation image having been stored on the radiation image storage panel 110 is capable of being read out uniformly and accurately. The deflection quantity X of the radiation image storage panel 110 should preferably be at most 500 µm, and should more preferably be at most 200 µm.

In cases where the deflection quantity X of the radiation image storage panel 110 is to be measured, the securing and supporting of the two sides of the radiation image storage panel 110, which two sides stand facing each other, need not necessarily be performed over the entire lengths of the end portions at the two sides of the radiation image storage panel 110, which two sides extend in the longitudinal direction of the radiation image storage panel 110, as illustrated in FIG. 10. For example, at least three points at the two sides of the radiation image storage panel 110 (one point at one side of the radiation image storage panel 110 and two points spaced from each other at the other side standing to face the one side) may be supported by the supporting means 140.

In the fourth embodiment of the radiation image storage panel in accordance with the present invention, from the view point of the rigidity, the flatness, and the transparency, the rigid sheet 111 should preferably be a glass sheet. In such cases, in order for the deflection quantity X to be kept within the range described above, the thickness D (in units of mm) of the rigid sheet 111 should preferably satisfy the formula:

$$L/110 < D < 15$$

wherein L (in units of mm) represents the distance (the span length) between the positions which secure and support the two sides of the radiation image storage panel 110.

Figure 11:
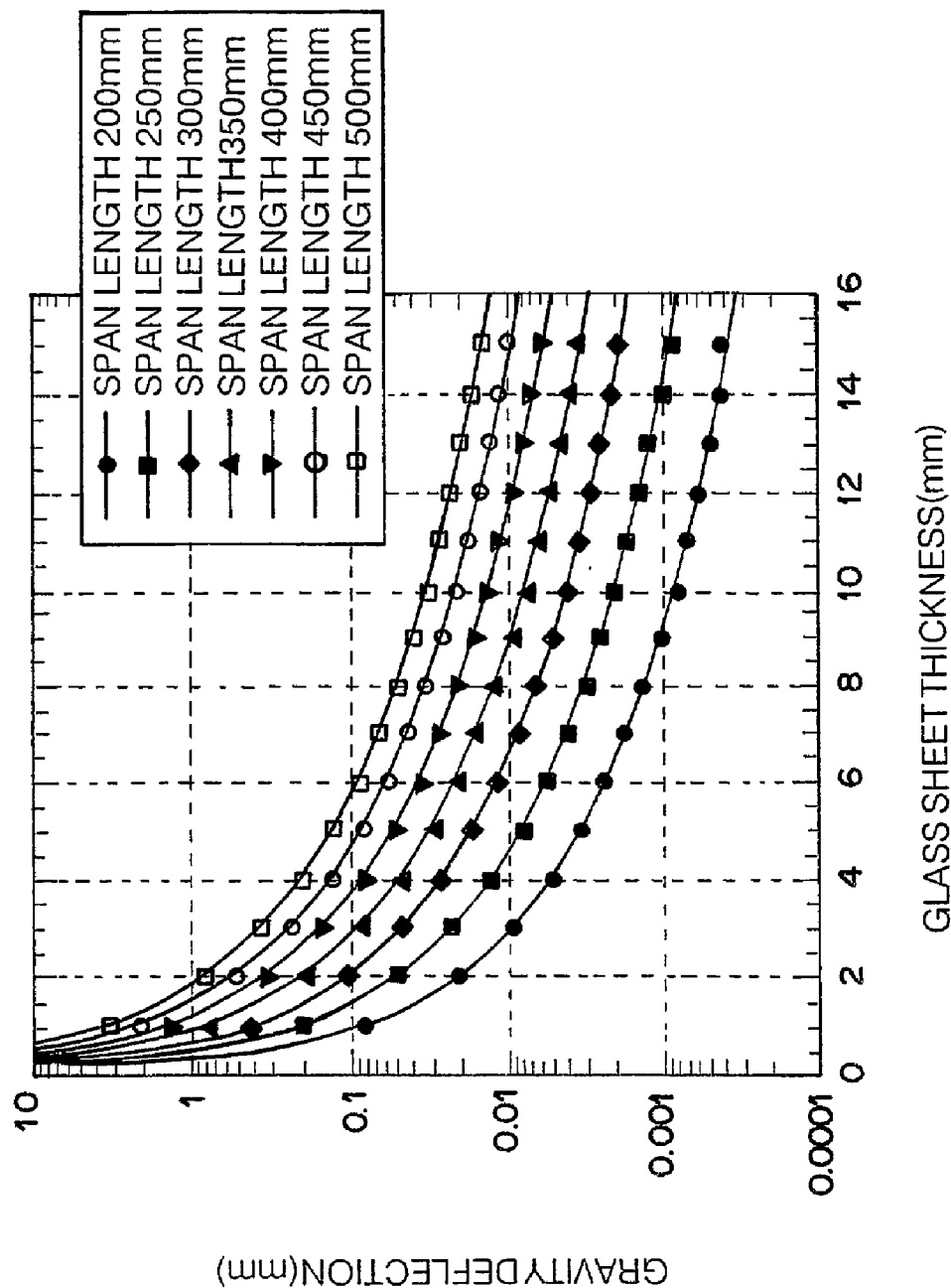
FIG. 11 is a graph showing relationship between a thickness of a glass sheet and a gravity deflection quantity of the glass sheet.

The lower limit value in the formula shown above is the value derived from the relationship between the span length and the deflection quantity shown in FIG. 11.

FIG. 11 is a graph showing the relationships between the thickness of the glass sheet and the gravity deflection quantity of the glass sheet, which relationships are obtained when the span length is set at various different values.

From the graph of FIG. 11, it can be found that, in cases where the thickness D (mm) of the glass sheet is set to be at least L/110, the gravity deflection quantity of the glass sheet alone, which occurs when the glass sheet alone is supported at the two sides of the glass sheet, is capable of being suppressed to be at most 100 µm. Therefore, in cases where the phosphor layer, and the like, are overlaid on the glass sheet, the gravity deflection quantity of the obtained radiation image storage panel as a whole is capable of being suppressed to be at most 200 µm.

Figure 12:
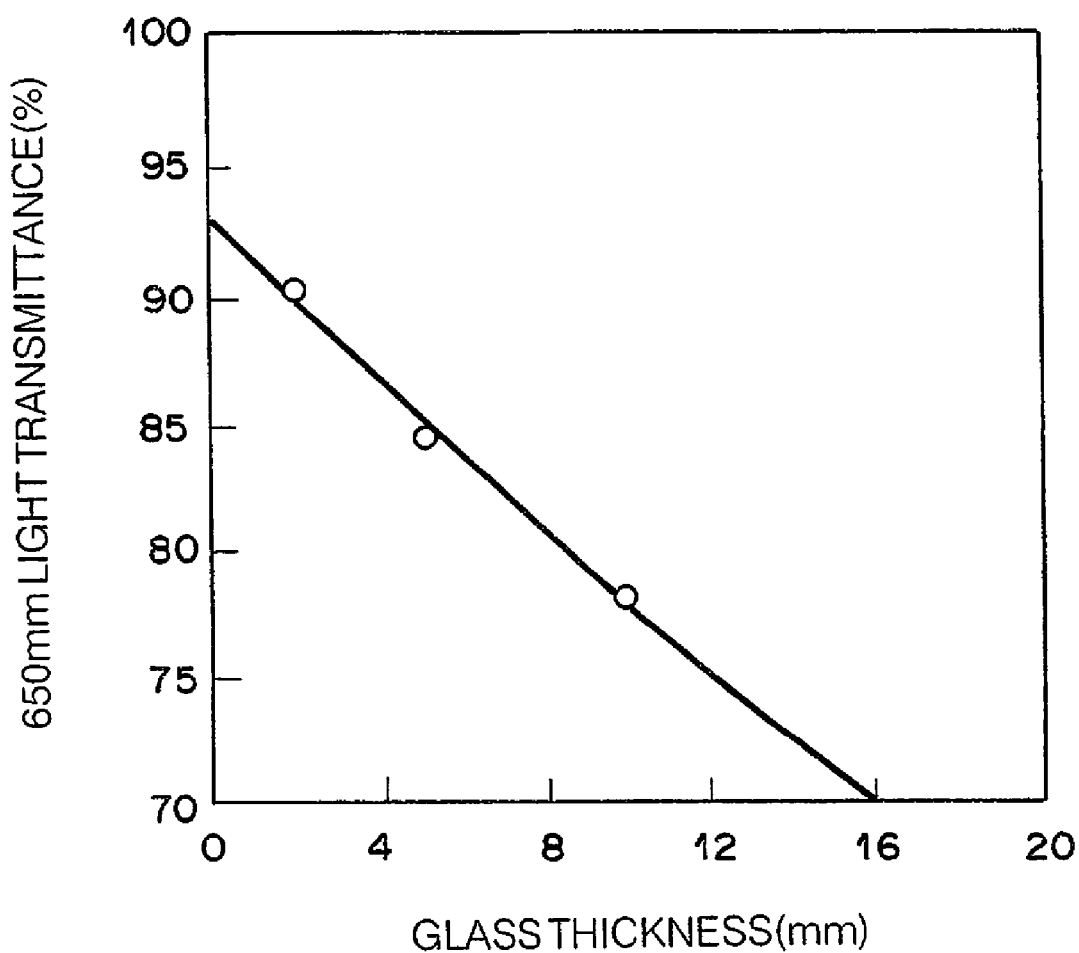
FIG. 12 is a graph showing relationship between a thickness of a glass sheet and a light transmittance of the glass sheet with respect to light having a wavelength of 650 nm.
Figure 13:
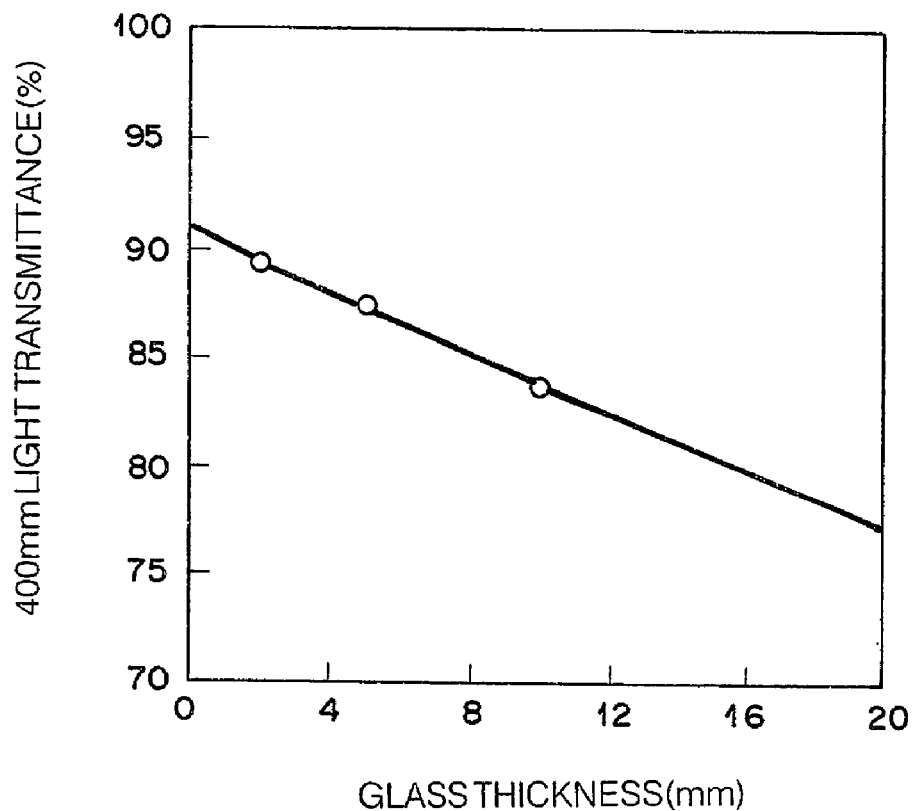
FIG. 13 is a graph showing relationship between a thickness of a glass sheet and a light transmittance of the glass sheet with respect to light having a wavelength of 400 nm.

The upper limit value in the formula shown above is the value derived from the light transmittance of the glass sheet. As illustrated in FIG. 12 and FIG. 13, as the thickness of the glass sheet becomes thick, the light transmittance of the glass sheet becomes low.

FIG. 12 is a graph showing the relationship between the thickness of the glass sheet and the light transmittance of the glass sheet with respect to light having a wavelength of 650 nm. FIG. 13 is a graph showing the relationship between the thickness of the glass sheet and the light transmittance of the glass sheet with respect to light having a wavelength of 400 nm. The wavelength of 650 nm is an ordinary value of the wavelength of the stimulating rays. The wavelength of 400 nm is an ordinary value of the wavelength of the light emitted by the radiation image storage panel 110.

If the transmittance of the rigid sheet 111 with respect to the stimulating rays and the transmittance of the rigid sheet 111 with respect to the light emitted by the radiation image storage panel 110 are lower than predetermined values, the image quality of the obtained image will become bad. In the fourth embodiment of the radiation image storage panel in accordance with the present invention, as the lower limit values for obtaining good image quality, the transmittance of the rigid sheet 111 with respect to the stimulating rays is set to be at least 70%, and the transmittance of the rigid sheet 111 with respect to the light emitted by the radiation image storage panel 110 is set to be at least 80%. As illustrated in FIG. 12 and FIG. 13, in order for the transmittance conditions described above to be satisfied, the thickness of the rigid sheet 111 should be at most 15 mm.

The radiation image storage panel in accordance with the present invention is not limited to the constitution illustrated in FIG. 9. For example, the stimulable phosphor layer 112 may be formed over the entire area of the surface of the rigid sheet 111. Also, as will be described later, the radiation image storage panel may be provided with various other known layers, such as an auxiliary layer and a protective film.

How the fourth embodiment of the radiation image storage panel in accordance with the present invention is produced will be described hereinbelow by taking the cases, where the phosphor is the stimulable phosphor, as an example.

The rigid sheet should preferably have the characteristics such that the rigid sheet has the rigidity and the transparency, the two opposite surfaces of the rigid sheet constitute flat surfaces, and the two flat surfaces are parallel with each other. Also, the modulus of elasticity of the rigid sheet should preferably be at least 1×10 GPa, and should more preferably fall within the range of 2×10 GPa to 1×10$^4$ GPa. A typical example of the material for the rigid sheet is a glass sheet. The glass sheet should preferably be a glass sheet formed by polishing the surfaces of a soda-lime glass and thereby enhancing the flatness of the soda-lime glass. Examples of the glass sheets include FL0.7, FL0.85, and FL1.0 (supplied by Central Glass Co., Ltd.); UFF0.40, 0.50, 0.55, and 0.70 (supplied by Nippon Sheet Glass Co., Ltd.); and RRQS40SX (supplied by Asahi Glass Co., Ltd.).

The phosphor layer is overlaid on the rigid sheet. The phosphor layer may be, for example, the stimulable phosphor layer.

The stimulable phosphor should preferably have the characteristics such that, when the stimulable phosphor is exposed to the stimulating rays having wavelengths falling within the range of 400 nm to 900 nm, the stimulable phosphor emits light having wavelengths falling within the range of 300 nm to 500 nm. Examples of the stimulable phosphors, which may be employed in the fourth embodiment of the radiation image storage panel in accordance with the present invention, are described in detail in, for example, Japanese Patent Publication No. 7(1995)-84588, and Japanese Unexamined Patent Publication Nos. 2(1990)-193100 and 4(1992)-310900.

Of the stimulable phosphors, an alkali metal halide type of stimulable phosphor, which may be represented by Formula (I) acting as a fundamental composition formula, is particularly preferable.

$$M^I X \cdot aM^{II} X'_2 \cdot bM^{III} X''_3 : zA \qquad (I)$$

wherein $M^I$ is at least one kind of alkali metal selected from the group consisting of Li, Na, K, Rb, and Cs, $M^{II}$ is at least one kind of alkaline earth metal or bivalent metal selected from the group consisting of Be, Mg, Ca, Sr, Ba, Ni, Cu, Zn, and Cd, $M^{III}$ is at least one kind of rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga, and In, A is at least one kind of rare earth element or metal selected from the group consisting of Y, Ce, Pr, Nd, Sm, Eu, Gd, Tb, Dy, Ho, Er, Tm, Yb, Lu, Na, Mg, Cu, Ag, Tl, and Bi, each of X, X', and X" is at least one kind of halogen selected from the group consisting of F, Cl, Br, and I, a is a number falling within the range of $0 \leq a < 0.5$, b is a number falling within the range of $0 \leq b < 0.5$, and z is a number falling within the range of $0 < z < 1.0$.

In Formula (I), $M^I$ should preferably contain at least Cs. Also, X should preferably contain at least Br. Further, A should preferably be Eu or Bi. When necessary, the stimulable phosphor represented by Formula (I) may contain a metal oxide, such as aluminum oxide, silicon dioxide, or zirconium oxide, as an additive in a proportion of at most 0.5 mol per mol of $M^I$.

A rare earth element-activated alkaline earth metal fluorohalide type of stimulable phosphor, which may be represented by Formula (II) acting as a fundamental composition formula, is also preferable.

$$M^{II} FX : zLn \qquad (II)$$

in which $M^{II}$ is at least one kind of alkaline earth metal selected from the group consisting of Ba, Sr, and Ca, Ln is at least one kind of rare earth element selected from the group consisting of Ce, Pr, Sm, Eu, Tb, Dy, Ho, Nd, Er, Tm, and Yb, X is at least one kind of halogen selected from the group consisting of Cl, Br, and I, and z is a number falling within the range of $0 < z \leq 0.2$.

In Formula (II) shown above, Ba should preferably constitute at least one half of the $M^{II}$. Also, Ln should preferably be Eu or Ce. Further, in Formula (II), though it may appear that F:X=1:1, the part labeled $M^{II}FX$ does not represent the stoichiometric constitution of the final composition, and represents that the composition has a BaFX type of crystal structure. In general, a state of a BaFX crystal, in which a large number of F$^+$(X$^-$) center points, which are the vacancies of X$^-$ions, have been formed, is preferable for enhancing the light emission efficiency with respect to light having wavelengths falling within the range of 600 nm to 700 nm. In such cases, F will often be in slight excess of X.

Though not defined in Formula (II), when necessary, one or at least two of the additives represented by the formulas shown below may be added to the stimulable phosphor represented by Formula (II):

$$bA, wN^I, xN^{II}, yN^{III}$$

In the formulas representing the additives, A represents a metal oxide, such as $Al_2O_3$, $SiO_2$, or $ZrO_2$. In order for the $M^{II}FX$ particles to be prevented from being sintered with each other, as the metal oxide represented by A, a metal oxide, which is of ultrafine particles having a mean particle diameter of the primary particles of at most 0.1 μm and has a low reactivity with respect to $M^{II}FX$, should preferably be employed. $N^I$ represents at least one kind of alkali metal compound selected from the group consisting of a compound of Li, a compound of Na, a compound of K, a compound of Rb, and a compound of Cs, $N^{II}$ represents at least one kind of alkaline earth metal compound selected from the group consisting of a compound of Mg and a compound of Be, and $N^{III}$ represents at least one trivalent-metal compound selected from the group consisting of a compound of Al, a compound of Ga, a compound of In, a compound of Tl, a compound of Sc, a compound of Y, a compound of La, a compound of Gd, and a compound of Lu. As the metal compounds described above, halides as described in Japanese Unexamined Patent Publication No. 59(1984)-75200 should preferably be employed. However, the metal compounds are not limited to the halides.

Also, b, w, x, and y represent the amounts of the compounds added per mol of $M^{II}FX$ and are numbers respectively satisfying $0 \leq b \leq 0.5$, $0 \leq w \leq 2$, $0 \leq x \leq 0.3$, and $0 \leq y \leq 0.3$. As for an additive, whose weight decreases due to calcination and subsequent washing processing, the number representing the amount of the compound added does not represent the element ratio in a finally obtained composition. Certain additives will remain as the added compounds in the finally obtained composition, and certain additives will react with $M^{II}FX$ or will be taken into $M^{II}FX$.

Further, when necessary, compounds described below may be added as additives to the stimulable phosphor represented by Formula (II):

Zn and Cd compounds, as described in Japanese Unexamined Patent Publication No. 55(1980)-12145, metal oxides $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$, and $ThO_2$, as described in Japanese Unexamined Patent Publication No. 55(1980)-160078, Zr and Sc compounds, as described in Japanese Unexamined Patent Publication No. 56(1981)-116777, B compounds, as described in Japanese Unexamined Patent Publication No. 57(1982)-23673, As and Si compounds, as described in Japanese Unexamined Patent Publication No. 57(1982)-23675, tetrafluoro boric acid compounds, as described in Japanese Unexamined Patent Publication No. 59(1984)-27980, hexafluoro compounds constituted of monovalent or bivalent salts of hexafluoro silicic acid, hexafluoro titanic acid, or hexafluoro zirconic acid, as described in Japanese Unexamined Patent Publication No. 59(1984)-47289, and compounds of transition metals, such as V, Cr, Mn, Fe, Co, and Ni, as described in Japanese Unexamined Patent Publication No. 59(1984)-56480.

However, the rare earth element-activated alkaline earth metal fluorohalide type of stimulable phosphor, which may be employed in the radiation image storage panel in accordance with the present invention, is not limited to the phosphors containing the additives described above and may be selected from various stimulable phosphors, which has the composition basically regarded as the rare earth element-activated alkaline earth metal fluorohalide type of stimulable phosphor.

However, in the fourth embodiment of the radiation image storage panel in accordance with the present invention, the phosphor is not limited to the stimulable phosphor and may be a phosphor, which absorbs the radiation, such as the X-rays, and instantaneously emits light having wavelengths of the ultraviolet to visible region. Examples of the phosphors exhibiting the instantaneous light emission include an $LnTaO_4$:(Nb,Gd) type of phosphor, an $Ln_2SiO_5$:Ce type of phosphor, an LnOX:Tm type of phosphor (where Ln is a rare earth element), a CsX type of phosphor (where X is a halogen), $Gd_2O_2S$:Tb, $Gd_2O_2S$:Pr,Ce, $ZnWO_4$, $LuAlO_3$:Ce, $Gd_3Ga_5O_{12}$:Cr,Ce, and $HfO_2$.

The phosphor layer in the fourth embodiment of the radiation image storage panel in accordance with the present invention may be formed on the rigid sheet in the manner described below with, for example, an electron beam vacuum evaporation technique, which is one of the vapor phase deposition techniques. With the vapor phase deposition technique, a phosphor layer containing no binder and comprising prismatic crystals of the phosphor is capable of being obtained. Therefore, the stimulating ray entry efficiency and the emitted light pick-up efficiency are capable of being enhanced, and the sensitivity of the radiation image storage panel is capable of being kept high. Also, since the scattering of the stimulating rays toward the flat surface direction is capable of being prevented, an image having a high sharpness is capable of being obtained. Further, with the electron beam vacuum evaporation technique, the prismatic crystals having good shapes and uniform orientation are capable of being obtained.

With the electron beam vacuum evaporation technique, specifically, a stimulable phosphor, which acts as an evaporation source, and a rigid sheet material, onto which the stimulable phosphor is to be evaporated, are located within a vacuum evaporation apparatus. The vacuum evaporation apparatus is then evacuated to a degree of vacuum falling within the range of approximately $1 \times 10^{-5}$ Pa to approximately $1 \times 10^{-2}$ Pa. At this time, an inert gas, such as an Ar gas or a Ne gas, may be introduced into the vacuum evaporation apparatus, while the degree of vacuum in the vacuum evaporation apparatus is being kept within the range described above.

The stimulable phosphor should preferably be processed into a tablet shape with pressure compression. Ordinarily, the pressure compression is performed under a pressure falling within the range of 800 $kg/cm^2$ to 1,000 $kg/cm^2$. At the time of the compression, the stimulable phosphor may be heated to a temperature falling within the range of 50° C. to 200° C. Also, after the compression has been performed, the obtained tablets may be subjected to dehydration and degassing processing by being, for example, heated under reduced pressure. A relative density of the tablets should preferably fall within the range of 80% to 98%, and a water content of the tablets should preferably be at most 0.5% by weight. Further, in lieu of the phosphor, raw materials for the phosphor or a mixture of the raw materials for the phosphor may be utilized.

Thereafter, an electron beam is produced by an electron gun and irradiated to the evaporation source. At this time, a partial water vapor pressure in the atmosphere within the vacuum evaporation apparatus should preferably be set to be at most $7.0 \times 10^{-3}$ Pa. Also, the accelerating voltage for the electron beam should preferably be set to fall within the range of 1.5 kV to 5.0 kV. When the electron beam is irradiated to the stimulable phosphor acting as the evaporation source, the stimulable phosphor is heated, evaporated, and deposited on the surface of the rigid sheet material. The vacuum evaporation rate ordinarily falls within the range of 0.1 µm/minute to 1,000 µm/minute, and should preferably fall within the range of 1 µm/minute to 100 µm/minute. The irradiation of the electron beam may be performed in a plurality of stages, and two or more phosphor layers may thereby be formed. Alternatively, a plurality of electron guns may be utilized, and different phosphors may be co-evaporated. As another alternative, raw materials for the phosphor may be utilized, the phosphor may be synthesized from the raw materials on the rigid sheet, and the phosphor layer may thereby be formed on the rigid sheet. Further, during the vacuum evaporation, when necessary, the rigid sheet material, onto which the stimulable phosphor is to be evaporated, may be cooled or heated. Furthermore, after the vacuum evaporation has been finished, the phosphor layer may be subjected to heating processing (annealing processing).

In the manner described above, the layer constituted of the prismatic crystals of the stimulable phosphor having grown approximately in the thickness direction of the layer is obtained on the rigid sheet. The layer thickness of the phosphor layer ordinarily falls within the range of 50 µm to 1,000 µm, and should preferably fall within the range of 200 µm to 700 µm. The phosphor layer contains no binder and consists of the phosphor. Also, cracks are present between the prismatic crystals of the phosphor.

The vapor phase deposition technique is not limited to the electron beam vacuum evaporation technique described above and may be one of various other known techniques, such as the other vacuum evaporation techniques (e.g., the resistance heating technique), a sputtering technique, and a chemical vapor deposition (CVD) technique.

Alternatively, the stimulable phosphor layer may be formed with a coating technique. With the coating technique, stimulable phosphor particles and a binder are dispersed in an appropriate organic solvent, and a coating composition is thereby prepared. The coating composition is applied onto the rigid sheet by use of a coating machine, and the applied coating composition is dried. In this manner, the phosphor layer comprising the binder and the phosphor particles dispersed in the binder is obtained. The ratio (the weight ratio) of the binder to the phosphor in the coating composition ordinarily falls within the range between 1:1 and 1:100, and should preferably fall within the range between 1:8 and 1:40. The binder may be selected appropriately from various known binder resins.

Also, the stimulable phosphor layer need not necessarily be formed directly on the rigid sheet. For example, the phosphor layer may be formed on a particularly prepared temporary substrate or a protective film, which will be described later. When necessary, the phosphor layer may then be separated from the temporary substrate. Thereafter, the phosphor layer may be adhered to the rigid sheet by use of an adhesive agent.

When necessary, in order for the sensitivity of the radiation image storage panel or the image quality (sharpness or graininess characteristics) of the obtained image to be enhanced, a light reflecting layer, which is constituted of a light reflecting material, such as alumina, titanium oxide, or barium sulfate, or a light absorbing layer, which is constituted of a light absorbing material, such as carbon black, may be overlaid on the phosphor layer.

Further, in order for the phosphor layer of the radiation image storage panel to be protected physically or chemically, the protective film may be formed on the surface of the phosphor layer, which surface is opposite to the surface standing to face the rigid sheet. The protective film should preferably exhibit little radiation absorption and a low moisture permeability. Examples of resin materials, which may be employed for the formation of the protective film, include various resin materials, such as a polyethylene terephthalate resin, a polyethylene naphthalate resin, an aramid resin, and a polyimide resin. The resin material may be loaded with the light reflecting material described above, or may contain voids. Alternatively, the resin material may be loaded with the light absorbing material described above. Also, the protective film may be a metal sheet, a ceramic material sheet, a glass sheet, or a quartz sheet. The thickness of the protective film ordinarily falls within the range of 5 µm to 1,000 µm.

In the manner described above, the fourth embodiment of the radiation image storage panel in accordance with the present invention is obtained. The fourth embodiment of the radiation image storage panel in accordance with the present invention may contain various known variations. For example, such that the sharpness of the obtained image may be enhanced, at least one of the layers constituting the radiation image storage panel may be colored with a coloring agent, which is capable of absorbing only the stimulating rays and does not absorb the light emitted by the stimulable phosphor layer.

The present invention will further be illustrated by the following non-limitative examples.

EXAMPLE 3

1) An adhesive agent, which contained an acrylic type of resin as a main constituent, was applied onto a surface of a polyethylene terephthalate sheet (acting as a protective film, thickness: 188 µm). In this manner, a coating film of a prime-coating layer was formed.

2) Fine alumina particles and an acrylic type of resin in a weight ratio of 10:1 were dispersed in an organic solvent, and a light reflecting material dispersion was thereby prepared. The thus prepared dispersion was applied onto the coating film described above by use of a coating machine and dried. In this manner, the prime-coating layer (layer thickness: approximately 20 µm) and a light reflecting layer (layer thickness: approximately 100 µm) were formed.

3) Stimulable phosphor particles (BaF(Br,I):Eu) an a urethane resin in a weight ratio of 20:1 were dispersed in an organic solvent, and a phosphor dispersion was thereby prepared. Thereafter, the phosphor dispersion was applied onto the surface of the light reflecting layer by use of a coating machine and dried. In this manner, a phosphor layer ((layer thickness: approximately 250 µm) was formed.

In the manner described above, a phosphor sheet (size: 410 mm×430 mm) comprising the protective film, the prime-coating layer, the light reflecting layer, and the phosphor layer located in this order was prepared.

4) The phosphor sheet was adhered to a surface of a soda-lime glass sheet (acting as a rigid sheet, size: 430 mm×450 mm, thickness: 5 mm) by use of an adhesive agent, such that the phosphor layer side of the phosphor sheet might be in contact with the surface of the soda-lime glass sheet. In this manner, a fifth embodiment of the radiation image storage panel in accordance with the present invention, which is illustrated in FIG. 14, was obtained.

Figure 14:
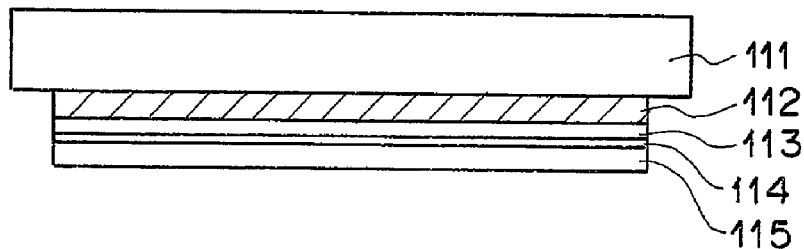
FIG. 14 is a schematic sectional view showing a fifth embodiment of the radiation image storage panel in accordance with the present invention.

FIG. 14 is a schematic sectional view showing the fifth embodiment of the radiation image storage panel in accordance with the present invention. As illustrated in FIG. 14, the fifth embodiment of the radiation image storage panel in accordance with the present invention comprises the glass rigid sheet 111, the stimulable phosphor layer 112, a light reflecting layer 113, a prime-coating layer 114, and a protective film 115, which are located in this order.

As illustrated in FIG. 10, the two sides of the glass sheet of the obtained radiation image storage panel, which two sides extended in the longitudinal direction of the glass sheet of the radiation image storage panel and stood facing each other, were secured and supported by the supporting means and the radiation image storage panel was thus held horizontally. In this state, the deflection quantity X at the center position of the radiation image storage panel was measured. The deflection quantity X was 150 µm. Also, the X-ray absorptivity of the combination of the layers (i.e., the light reflecting layer 113, the prime-coating layer 114, and the protective film 115), which were located on the side of the stimulable phosphor layer 112 opposite to the rigid sheet 111, was approximately 1%. How the X-ray absorptivity was measured will be described hereinbelow.

(1) A small piece of a light reflecting sheet, which comprised the protective film, the prime-coating layer overlaid on the protective film, and the light reflecting layer overlaid on the prime-coating layer, was prepared. The small piece of the light reflecting sheet was superposed upon a surface of a radiation image storage panel subjected to the measurement. Also, in this state, irradiation of X-rays was performed from the side of the surface of the radiation image storage panel, upon which surface the small piece of the light reflecting sheet had been superposed.

(2) Thereafter, the light reflecting sheet was separated from the radiation image storage panel, which had been exposed to the X-rays. The amount of X-ray energy having been absorbed by the surface of the radiation image storage panel, upon which surface the light reflecting sheet had been superposed, was then detected with a read-out apparatus (BAS2000, supplied by Fuji Photo Film Co., Ltd.). The X-ray absorptivity was then calculated with the formula shown below.

$$X\text{-ray absorptivity} = 1 - (PSL1/PSL0)$$

wherein PSL1 represents the X-ray energy value at the area covered by the light reflecting sheet, and PSL0 represents the X-ray energy value at the area, which is not covered by the light reflecting sheet.

X-rays were irradiated via an object to the protective film side of the radiation image storage panel, which had been obtained in the manner described above. Also, the image readout was performed from the glass rigid sheet side of the radiation image storage panel by use of the radiation image read-out apparatus shown in FIG. 7. As a result, an image having good image quality could be obtained.

EXAMPLE 4

1) A stimulable phosphor (CsBr:Eu) was vacuum-evaporated onto a surface of a soda-lime glass sheet (acting as a rigid sheet, size: 430 mm×450 mm, thickness: 5 mm), which surface had been coated with silica, with an electron beam vacuum evaporation technique. In this manner, a stimulable phosphor layer (size: 410 mm×430 mm, layer thickness: approximately 500 μm) was formed on the soda-lime glass sheet. The stimulable phosphor layer had a structure such that prismatic crystals of the phosphor stood densely erect approximately in the vertical direction.

2) The same light reflecting material dispersion as that utilized in Example 3 was applied onto a temporary substrate and dried. In this manner, a light reflecting layer (layer thickness: approximately 100 μm) was formed on the temporary substrate.

3) The light reflecting layer was separated from the temporary substrate and adhered to a surface of the stimulable phosphor layer by use of an adhesive agent, which contained an acrylic type of resin as a main constituent. In this manner, an adhesive layer (layer thickness: approximately 2 μm) and the light reflecting layer (layer thickness: approximately 100 μm) were formed on the stimulable phosphor layer.

4) In order for sealing performance to be imparted, a polyethylene terephthalate film (acting as a protective film, thickness: 10 μm), which had been laminated with an aluminum foil (thickness: 20 μm), was adhered to the surface of the light reflecting layer and the area of the rigid sheet, which area had not be covered by the stimulable phosphor layer. In this manner, a sixth embodiment of the radiation image storage panel in accordance with the present invention, which is illustrated in FIG. 15, was obtained.

FIG. 15 is a schematic sectional view showing the sixth embodiment of the radiation image storage panel in accordance with the present invention. As illustrated in FIG. 15, the sixth embodiment of the radiation image storage panel in accordance with the present invention comprises the rigid sheet 111, the stimulable phosphor layer 112, an adhesive layer 116, the light reflecting layer 113, and a protective film 115', which are located in this order.

As illustrated in FIG. 10, the two sides of the glass sheet of the obtained radiation image storage panel, which two sides extended in the longitudinal direction of the glass sheet of the radiation image storage panel and stood facing each other, were secured and supported by the supporting means 140, and the radiation image storage panel was thus held horizontally. In this state, the deflection quantity X at the center position of the radiation image storage panel was measured. The deflection quantity X was 170 μm. Also, the X-ray absorptivity of the combination of the layers (i.e., the adhesive layer 116, the light reflecting layer 113, and the protective film 115'), which were located on the side of the stimulable phosphor layer 112 opposite to the rigid sheet 111, was approximately 1%.

X-rays were irradiated via an object to the protective film side of the radiation image storage panel, which had been obtained in the manner described above. Also, the image readout was performed from the glass sheet (rigid sheet) side of the radiation image storage panel by use of the radiation image read-out apparatus shown in FIG. 7. As a result, an image having good image quality could be obtained.

Seventh, eighth, ninth, and tenth embodiments of the radiation image storage panel in accordance with the present invention will be described hereinbelow.

Figure 16:
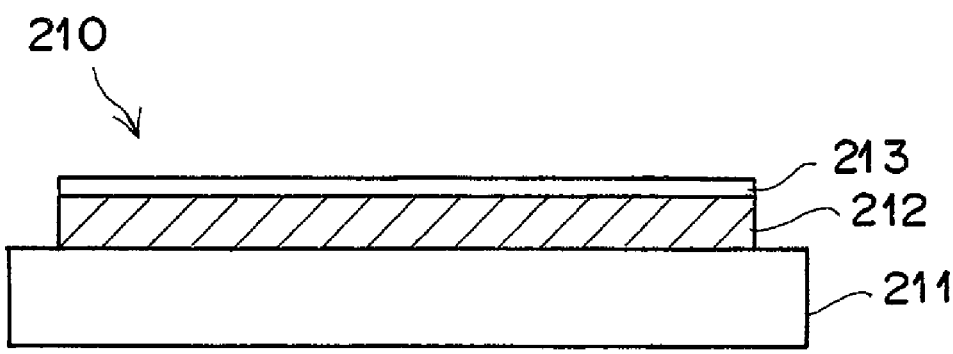
FIG. 16 is a schematic sectional view showing a seventh embodiment of the radiation image storage panel in accordance with the present invention.

FIG. 16 is a schematic sectional view showing a seventh embodiment of the radiation image storage panel in accordance with the present invention.

As illustrated in FIG. 16, a radiation image storage panel (i.e., a stimulable phosphor sheet) 210, which acts as a seventh embodiment of the radiation image storage panel in accordance with the present invention, comprises a substrate 211 having rigidity, a phosphor layer (in this case, a stimulable phosphor layer) 212 overlaid on the substrate 211, and a protective layer 213 overlaid on the stimulable phosphor layer 212. The stimulable phosphor layer 212 and the protective layer 213 are overlaid on an area of the surface of the substrate 211, which area is positioned more inward than the peripheral ends of the substrate 211.

Figure 17:
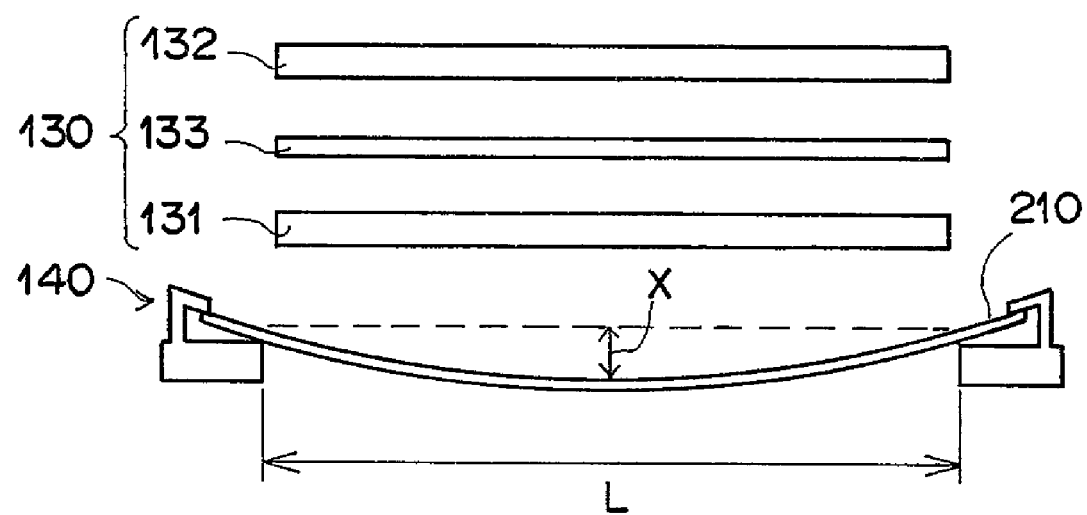
FIG. 17 is a schematic sectional view showing an example of a mechanism for securing and supporting two sides of the radiation image storage panel, which two sides stand facing each other.

In the seventh embodiment of the radiation image storage panel in accordance with the present invention, the radiation image storage panel 210 is set such that the deflection quantity X of the radiation image storage panel 210, which deflection quantity occurs when, as illustrated in FIG. 17, the radiation image storage panel 210 is secured and supported at two sides of the radiation image storage panel 210, the two sides standing to face each other, and the radiation image storage panel 210 is thus held horizontally, is at most 500 μm.

FIG. 17 is a schematic sectional view showing an example of a mechanism for securing and supporting two sides of the radiation image storage panel, which two sides stand facing each other, in a radiation image read-out apparatus. With reference to FIG. 17, end portions at the two sides of the radiation image storage panel 210, which two sides stand facing each other, are secured and supported by the supporting means 140, and the radiation image storage panel 210 is thus held horizontally with the side of the protective layer 213 facing up. Ordinarily, the end portions at the two sides of the radiation image storage panel 210, which two sides extend in the longitudinal direction of the radiation image storage panel 210, are secured and supported by the supporting means 140. As illustrated in FIG. 16, the stimulable phosphor layer 212 of the radiation image storage panel 210 is overlaid on the area of the surface of the substrate 211, which area is positioned more inward than the peripheral ends of the substrate 211. Therefore, only an area of the substrate 211, which area is not covered by the stimulable phosphor layer 212, i.e. only the area of the substrate 211 outward from the periphery of the stimulable phosphor layer 212, is grasped and secured by the supporting means 140. Also, as illustrated in FIG. 17, the detection means 130 (comprising the image forming lens 131, the line sensor 132, and the stimulating ray cut-off filter 133) of the radiation image read-out apparatus shown in FIG. 7 is located above the radiation image storage panel 210. The detection means 130 is capable of being moved in the direction normal to the plane of the sheet of FIG. 17.

The term "deflection quantity X" as used herein means the maximum value of the deflection. Ordinarily, the deflection quantity X is the deflection quantity at the center position of the radiation image storage panel 210. In cases where the deflection quantity X of the radiation image storage panel 210 is suppressed to be at most 500 μm, the image of the light emitted from the entire image recording region of the stimulable phosphor layer 212 of the radiation image storage panel 210, on which region the radiation image is capable of being stored, is capable of being formed on the line sensor 132 via the image forming lens 131. Therefore, the radiation image having been stored on the radiation image storage panel 210 is capable of being read out uniformly and accurately. The deflection quantity X of the radiation image storage panel 210 should preferably be at most 200 μm.

In cases where the deflection quantity X of the radiation image storage panel 210 is to be measured, the securing and supporting of the two sides of the radiation image storage panel 210, which two sides stand facing each other, need not necessarily be performed over the entire lengths of the end portions at the two sides of the radiation image storage panel 210, which two sides extend in the longitudinal direction of the radiation image storage panel 210, as illustrated in FIG. 17. For example, at least three points at the two sides of the radiation image storage panel 210 (one point at one side of the radiation image storage panel 210 and two points spaced from each other at the other side standing to face the one side) may be supported by the supporting means 140.

In the seventh embodiment of the radiation image storage panel in accordance with the present invention, the substrate 211 should have the rigidity, and the absorptivity of the substrate 211 with respect to the radiation, such as the X-rays, should be at most 20%. The absorptivity of the substrate 211 with respect to the radiation should preferably be at most 10%. As the substrate 211, a carbon fiber-reinforced plastic (CFRP) sheet is particularly preferable.

Figure 18:
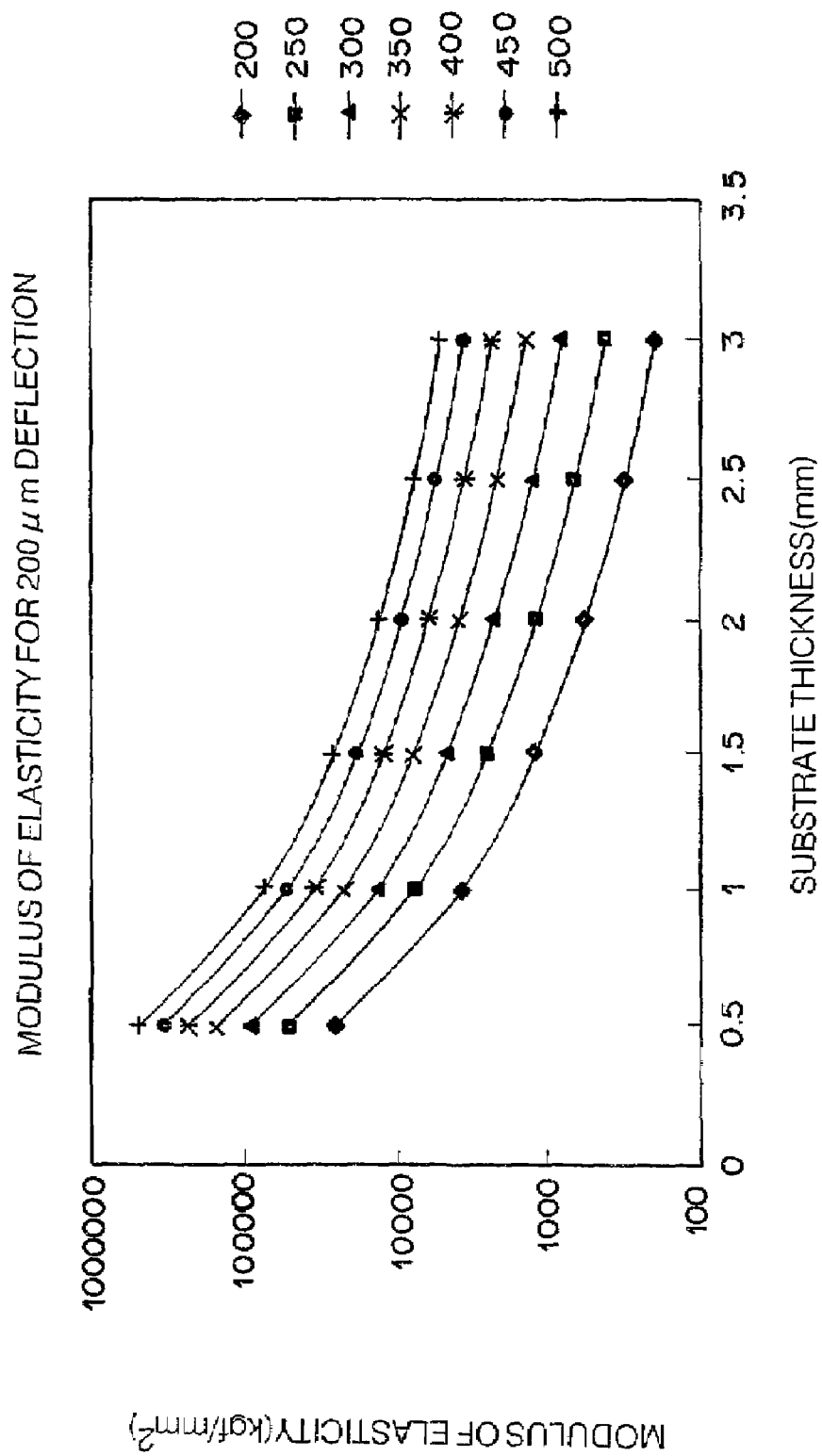
FIG. 18 is a graph showing relationship between a thickness of a CFRP sheet and a modulus of elasticity in flexure of the CFRP sheet.

FIG. 18 is a graph showing relationship between the thickness of a CFRP sheet and the modulus of elasticity in flexure of the CFRP sheet, which relationship is obtained when the span length is set at various different values, such that the deflection quantity of the CFRP sheet is kept to be at most 200 μm. From FIG. 18, it can be found that, in order for the deflection quantity X of the entire radiation image storage panel to be kept within the range described above, the CFRP substrate should preferably satisfy the conditions shown below with respect to the span length.

| Span length (mm) | Thickness (mm) | Modulus of elasticity in flexure (GPa) |
|---|---|---|
| 200 ~ 300 | 1 ~ 3.5 | 0.013 ~ 1.40 |
| 300 ~ 400 | 1 ~ 3.5 | 0.050 ~ 4.00 |
| 400 ~ 500 | 1 ~ 3.5 | 0.100 ~ 8.00 |

Also, the CFRP substrate should more preferably satisfy the conditions shown below with respect to the span length.

| Span length (mm) | Thickness (mm) | Modulus of elasticity in flexure (GPa) |
|---|---|---|
| 200 ~ 300 | 1 ~ 2.5 | 0.030 ~ 1.00 |
| 300 ~ 400 | 1 ~ 2.5 | 0.010 ~ 3.00 |
| 400 ~ 500 | 1 ~ 2.5 | 0.300 ~ 4.00 |

The thickness of the CFRP substrate should most preferably fall within the range of 1.5 mm to 2.5 mm, and the modulus of elasticity in flexure of the CFRP substrate should most preferably fall within the range of 0.5 GPa to 4 GPa (approximately 5,000 kgf/mm$^2$ to approximately 40,000 kgf/mm$^2$). In cases where the thickness of the CFRP substrate and the modulus of elasticity in flexure of the CFRP substrate fall within the ranges described above, with respect to any value of the span length, the CFRP substrate exhibits a radiation absorptivity of at most 10%. Also, in cases where the phosphor layer, and the like, are overlaid on the CFRP substrate, the gravity deflection quantity of the obtained radiation image storage panel as a whole is capable of being suppressed to be at most 200 μm.

The radiation image storage panel in accordance with the present invention is not limited to the constitution illustrated in FIG. 16. For example, the stimulable phosphor layer 212 may be formed over the entire area of the surface of the substrate 211. Also, as will be described later, the radiation image storage panel may be provided with various other known auxiliary layers.

How the seventh embodiment of the radiation image storage panel in accordance with the present invention is produced will be described hereinbelow by taking the cases, where the phosphor is the stimulable phosphor, as an example.

The substrate having the rigidity may be a plastic material sheet, such as the carbon fiber-reinforced plastic (CFRP) sheet described above or a glass fiber-reinforced plastic (GFRP) sheet; a glass sheet; a metal sheet constituted of a metal exhibiting comparatively little radiation absorption, such as aluminum, a magnesium alloy, or beryllium; or a ceramic material sheet, such as a porous ceramic material sheet. Also, the substrate having the rigidity may be composed of two or more kinds of sheets overlaid one upon another. In such cases, as the sheet to be combined with the sheet described above, it is possible to employ, besides the sheet described above, a sheet constituted of one of various resin materials, such as a polyethylene terephthalate resin, a polyethylene naphthalate resin, an aramid resin, and a polyimide resin. The resin material may be loaded with the light reflecting material, such as alumina, titanium oxide, or barium sulfate, or may contain voids. Alternatively, the resin material may be loaded with the light absorbing material, such as carbon black. A sheet having the rigidity should be located on the outer side (i.e., on the side opposite to the phosphor layer).

When necessary, in order for the sensitivity of the radiation image storage panel or the image quality (sharpness or graininess characteristics) of the obtained image to be enhanced, a light reflecting layer, which is constituted of the light reflecting material, such as alumina, titanium oxide, or barium sulfate, or a light absorbing layer, which is constituted of the light absorbing material, such as carbon black, may be overlaid on the substrate. Also, various auxiliary layers, such as a prime-coating layer for enhancing the adhesion between the substrate and the phosphor layer, may be utilized.

The phosphor layer is overlaid on the substrate (or the auxiliary layer). The phosphor layer may be, for example, the stimulable phosphor layer. In such cases, the stimulable phosphor may be selected from the stimulable phosphors enumerated above with reference to the aforesaid fourth embodiment of the radiation image storage panel in accordance with the present invention.

However, in the seventh embodiment of the radiation image storage panel in accordance with the present invention, as in the fourth embodiment described above, the phosphor is not limited to the stimulable phosphor and may be the phosphor, which absorbs the radiation, such as the X-rays, and instantaneously emits light having wavelengths of the ultraviolet to visible region.

In the seventh embodiment of the radiation image storage panel in accordance with the present invention, the phosphor layer may be formed on the substrate in the manner described below with, for example, the electron beam vacuum evaporation technique, which is one of the vapor phase deposition techniques. With the vapor phase deposition technique, a phosphor layer containing no binder and comprising prismatic crystals of the phosphor is capable of being obtained. Therefore, the stimulating ray entry efficiency and the emitted light pick-up efficiency are capable of being enhanced, and the sensitivity of the radiation image storage panel is capable of being kept high. Also, since the scattering of the stimulating rays toward the flat surface direction is capable of being prevented, an image having a high sharpness is capable of being obtained. Further, with the electron beam vacuum evaporation technique, the prismatic crystals having good shapes and uniform orientation are capable of being obtained.

With the electron beam vacuum evaporation technique, specifically, a stimulable phosphor, which acts as an evaporation source, and a substrate, onto which the stimulable phosphor is to be evaporated, are located within a vacuum evaporation apparatus. The vacuum evaporation apparatus is then evacuated to a degree of vacuum falling within the range of approximately $1 \times 10^{-5}$ Pa to approximately $1 \times 10^{-2}$ Pa. At this time, an inert gas, such as an Ar gas or a Ne gas, may be introduced into the vacuum evaporation apparatus, while the degree of vacuum in the vacuum evaporation apparatus is being kept within the range described above.

The stimulable phosphor should preferably be processed into a tablet shape with pressure compression. Ordinarily, the pressure compression is performed under a pressure falling within the range of 800 kg/cm$^2$ to 1,000 kg/cm$^2$. At the time of the compression, the stimulable phosphor may be heated to a temperature falling within the range of 50° C. to 200° C. Also, after the compression has been performed, the obtained tablets may be subjected to dehydration and degassing processing by being, for example, heated under reduced pressure. A relative density of the tablets should preferably fall within the range of 80% to 98%, and a water content of the tablets should preferably be at most 0.5% by weight. Further, in lieu of the phosphor, raw materials for the phosphor or a mixture of the raw materials for the phosphor may be utilized.

Thereafter, an electron beam is produced by an electron gun and irradiated to the evaporation source. At this time, a partial water vapor pressure in the atmosphere within the vacuum evaporation apparatus should preferably be set to be at most $7.0 \times 10^{-3}$ Pa. Also, the accelerating voltage for the electron beam should preferably be set to fall within the range of 1.5 kV to 5.0 kV. When the electron beam is irradiated to the stimulable phosphor acting as the evaporation source, the stimulable phosphor is heated, evaporated, and deposited on the surface of the substrate. The vacuum evaporation rate ordinarily falls within the range of 0.1 µm/minute to 1,000 µm/minute, and should preferably fall within the range of 1 µm/minute to 100 µm/minute. The irradiation of the electron beam may be performed in a plurality of stages, and two or more phosphor layers may thereby be formed. Alternatively, a plurality of electron guns may be utilized, and different phosphors may be co-evaporated. As another alternative, raw materials for the phosphor may be utilized, the phosphor may be synthesized from the raw materials on the rigid material, and the phosphor layer may thereby be formed on the rigid material. Further, during the vacuum evaporation, when necessary, the rigid material, onto which the stimulable phosphor is to be evaporated, may be cooled or heated. Furthermore, after the vacuum evaporation has been finished, the phosphor layer may be subjected to the heating processing (the annealing processing).

In the manner described above, the layer constituted of the prismatic crystals of the stimulable phosphor having grown approximately in the thickness direction of the layer is obtained on the substrate. The layer thickness of the phosphor layer ordinarily falls within the range of 50 µm to 1,000 µm, and should preferably fall within the range of 200 µm to 700 µm. The phosphor layer contains no binder and consists of the phosphor. Also, cracks are present between the prismatic crystals of the phosphor.

The vapor phase deposition technique is not limited to the electron beam vacuum evaporation technique described above and may be one of various other known techniques, such as the other vacuum evaporation techniques (e.g., the resistance heating technique), a sputtering technique, and a chemical vapor deposition (CVD) technique.

Alternatively, the stimulable phosphor layer may be formed with a coating technique. With the coating technique, stimulable phosphor particles and a binder are dispersed in an appropriate organic solvent, and a coating composition is thereby prepared. The coating composition is applied onto the substrate by use of a coating machine, and the applied coating composition is dried. In this manner, the phosphor layer comprising the binder and the phosphor particles dispersed in the binder is obtained. The ratio (the weight ratio) of the binder to the phosphor in the coating composition ordinarily falls within the range between 1:1 and 1:100, and should preferably fall within the range between 1:8 and 1:40. The binder may be selected appropriately from various known binder resins.

Such that the processing of the radiation image storage panel may be facilitated, and a change in characteristics of the radiation image storage panel may be avoided, the protective layer should preferably be formed on the surface of the phosphor layer. Such that the incidence of the stimulating rays and the radiating-out of the light emitted by the radiation image storage panel may not be affected, the protective layer should preferably be transparent. Also, such that the radiation image storage panel may be protected sufficiently from physical shocks and chemical attacks given from the exterior, the protective layer should preferably be chemically stable and have good moisture-proof properties and a high physical strength.

The protective layer may be formed by dissolving a transparent organic high-molecular substance, such as a cellulose derivative, a polymethyl methacrylate, or an organic solvent-soluble fluorine type of resin, in an appropriate solvent, and applying the thus prepared solution onto the phosphor layer. Alternatively, the protective layer may be formed by preparing a protective layer forming sheet and adhering the protective layer forming sheet to the surface of the phosphor layer by use of an appropriate adhesive agent. The protective layer forming sheet may be constituted of an organic polymer film formed from a polyethylene terephthalate, or the like, or a transparent glass plate. As another alternative, the protective layer may be formed by forming a film of an inorganic compound on the phosphor layer by the utilization of the vacuum evaporation technique. The protective layer may also contain various additives, such as light scattering fine particles (e.g., magnesium oxide, zinc oxide, titanium dioxide, and alumina), a lubricant (e.g., perfluoro olefin resin powder or silicone resin powder), and a crosslinking agent (e.g., a polyisocyanate). In cases where the protective layer is constituted of a high-molecular substance, the thickness of the protective layer ordinarily falls within the range of approximately 0.1 µm to approximately 20 µm. In cases where the protective layer is constituted of an organic compound, such as glass, the thickness of the protective layer ordinarily falls within the range of approximately 100 µm to approximately 1,000 µm.

In order to enhance anti-staining properties of the protective layer, a fluorine resin coating layer may be formed on the surface of the protective layer. The fluorine resin coating layer may be formed by dissolving (or dispersing) a fluorine resin in an organic solvent, applying the thus prepared fluorine resin solution (or dispersion) onto the surface of the protective layer, and drying the applied solution (or the dispersion). The fluorine resin may be used alone. However, ordinarily, the fluorine resin is used as a mixture with a resin having good film-forming properties. Also, an oligomer having a polysiloxane skeleton or an oligomer having a perfluoro alkyl group may be utilized in combination with the fluorine resin. In order to suppress interference nonuniformity and enhance the image quality of the obtained radiation image even further, a fine particle filler may be contained in the fluorine resin coating layer. The layer thickness of the fluorine resin coating layer ordinarily falls within the range of 0.5 µm to 20 µm. At the time of the formation of the fluorine resin coating layer, additive constituents, such as a crosslinking agent, a hardener, and an anti-yellowing agent may be utilized. In particular, the addition of the crosslinking agent is advantageous for enhancement of the durability of the fluorine resin coating layer.

The stimulable phosphor layer need not necessarily be formed directly on the substrate. For example, the phosphor layer may be formed on a particularly prepared temporary substrate. The phosphor layer may then be separated from the temporary substrate. Thereafter, the phosphor layer may be adhered to the substrate by use of an adhesive agent.

In cases where the radiation image storage panel is provided with the protective layer, it is also possible that the phosphor layer is formed on the protective layer. In such cases, in order for the parallelism and flatness of the surfaces of the radiation image storage panel to be enhanced, a filler layer may be formed between the phosphor layer and the substrate. The filler layer should preferably have a density lower than the density of the substrate and light weight, and should preferably exhibit little absorption of radiation. Examples of the filler constituting the filler layer include a non-woven fabric, a synthetic fiber, a natural fiber, a woven fabric of a synthetic fiber, a woven fabric of a natural fiber, or a glass fiber; a material having fine pores or voids, such as a foamed urethane, a foamed polyethylene terephthalate, a porous ceramic material, or a micro filter; an ordinary resin, particularly a resin having a density of at most 1.7, such as a polyethylene terephthalate, a polycarbonate, a polyurethane, an acrylic resin, or an epoxy resin; or a material comprising a binder and hollow particles (hollow polymer particles, or the like) mixed in the binder.

In cases where the filler has the adhesive properties, the filler layer may be formed by the coating onto the phosphor layer, and thereafter the substrate may be adhered to the filler layer. In cases where the filler has no adhesive properties, the filler layer may be adhered to the phosphor layer by use of an adhesive agent, and thereafter the substrate may be adhered to the filler layer by use of an adhesive agent. The layer thickness of the filler layer ordinarily falls within the range of 100 µm to 10,000 µm, and should preferably fall within the range of 1,000 µm to 5,000 µm.

In the manner described above, the seventh embodiment of the radiation image storage panel in accordance with the present invention is obtained. The seventh embodiment of the radiation image storage panel in accordance with the present invention may contain various known variations. For example, such that the sharpness of the obtained image may be enhanced, at least one of the layers constituting the radiation image storage panel may be colored with a coloring agent, which is capable of absorbing only the stimulating rays and does not absorb the light emitted by the stimulable phosphor layer.

The present invention will further be illustrated by the following non-limitative examples.

EXAMPLE 5

1) An adhesive agent, which contained an acrylic type of resin as a main constituent, was applied onto a surface of a polyethylene terephthalate sheet (acting as a second substrate, thickness: 188 µm). In this manner, a coating film of a prime-coating layer was formed.

2) Fine alumina particles and an acrylic type of resin in a weight ratio of 10:1 were dispersed in an organic solvent, and a light reflecting material dispersion was thereby prepared. The thus prepared dispersion was applied onto the coating film described above by use of a coating machine and dried. In this manner, the prime-coating layer (layer thickness: approximately 20 µm) and a light reflecting layer (layer thickness: approximately 100 µm) were formed.

3) Stimulable phosphor particles (BaF(Br,I):Eu) an a urethane resin in a weight ratio of 20:1 were dispersed in an organic solvent, and a phosphor dispersion was thereby prepared. Thereafter, the phosphor dispersion was applied onto the surface of the light reflecting layer by use of a coating machine and dried. In this manner, a phosphor layer ((layer thickness: approximately 250 µm) was formed.

4) A polyethylene terephthalate film (thickness: 10 µm) was adhered to the surface of the phosphor layer by use of an adhesive agent.

In the manner described above, a phosphor sheet (size: 410 mm×430 mm) comprising the second substrate, the prime-coating layer, the light reflecting layer, the phosphor layer, and the protective layer located in this order was prepared.

5) The phosphor sheet was adhered to a surface of a CFRP sheet (acting as a first substrate, size: 430 mm×450 mm, thickness: 2 mm, modulus of elasticity in flexure: 2.0 GPa) by use of an adhesive agent, such that the second substrate side of the phosphor sheet might be in contact with the surface of the CFRP sheet. In this manner, an eighth embodiment of the radiation image storage panel in accordance with the present invention, which is illustrated in FIG. 19, was obtained.

Figure 19:
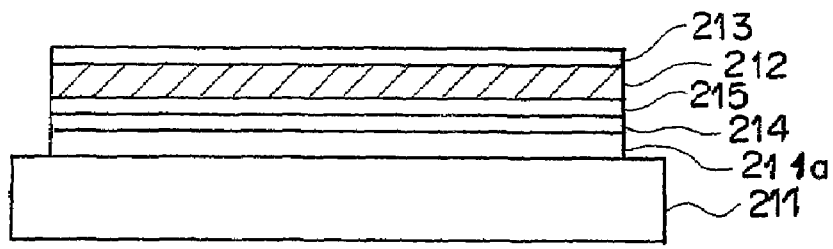
FIG. 19 is a schematic sectional view showing an eighth embodiment of the radiation image storage panel in accordance with the present invention.

FIG. 19 is a schematic sectional view showing the eighth embodiment of the radiation image storage panel in accordance with the present invention. As illustrated in FIG. 19, the eighth embodiment of the radiation image storage panel in accordance with the present invention comprises the first substrate 211, a second substrate 211a, a prime-coating layer 214, a light reflecting layer 215, the stimulable phosphor layer 212, and the protective layer 213, which are located in this order.

As illustrated in FIG. 17, the two sides of the first substrate of the obtained radiation image storage panel, which two sides extended in the longitudinal direction of the first substrate of the radiation image storage panel and stood facing each other, were secured and supported by the supporting means 140, and the radiation image storage panel was thus held horizontally. In this state, the deflection quantity X at the center position of the radiation image storage panel was measured. The deflection quantity X was 65 µm.

Also, the X-ray absorptivity of the entire substrate (i.e., the combination of the first substrate 211 and the second substrate 211a) was approximately 5%. The X-ray absorptivity was measured in the manner described below.

(1) A sheet piece was prepared by laminating the first substrate and the second substrate together. A certain region of the radiation image storage panel was covered by the thus prepared sheet piece, and X-rays were irradiated to the radiation image storage panel in this state.

(2) Thereafter, the sheet piece was separated from the radiation image storage panel, which had been exposed to the X-rays. The radiation image storage panel was then subjected to a read-out operation utilizing the read-out apparatus (BAS2000, supplied by Fuji Photo Film Co., Ltd.). The X-ray absorptivity was then calculated with the formula shown below.

X-ray absorptivity=1−(PSL1/PSL0)

wherein PSL1 represents the measured value at the area covered by the sheet piece, and PSL0 represents the measured value at the area, which is not covered by the sheet piece.

X-rays were irradiated via an object to the substrate side of the radiation image storage panel, which had been obtained in the manner described above. Also, the image readout was performed from the protective layer side of the radiation image storage panel by use of the radiation image read-out apparatus shown in FIG. 7. As a result, an image having good image quality could be obtained. Lowering of the image quality due to the provision of the protective layer was not observed.

EXAMPLE 6

1) A stimulable phosphor (CsBr:Eu) was vacuum-evaporated onto a surface of an alkali-free glass sheet (acting as a protective layer, size: 430 mm×450 mm, thickness: 0.7 mm) with the electron beam vacuum evaporation technique. In this manner, a stimulable phosphor layer (size: 410 mm×430 mm, layer thickness: approximately 500 μm) was formed on the alkali-free glass sheet. The stimulable phosphor layer had a structure such that prismatic crystals of the phosphor stood densely erect approximately in the vertical direction.

2) The same light reflecting material dispersion as that utilized in Example 5 was applied onto a temporary substrate and dried. In this manner, a light reflecting layer (layer thickness: approximately 100 μm) was formed on the temporary substrate.

3) The light reflecting layer was separated from the temporary substrate and adhered to a surface of the stimulable phosphor layer by use of an adhesive agent, which contained an acrylic type of resin as a main constituent. In this manner, an adhesive layer (layer thickness: approximately 2 μm) and the light reflecting layer (layer thickness: approximately 100 μm) were formed on the stimulable phosphor layer.

4) An epoxy resin for forming a filler layer was applied onto the surface of the light reflecting layer and the exposed surface area (the peripheral surface area) of the protective layer. Thereafter, a CFRP sheet (acting as a substrate, size: 430 mm×450 mm, thickness: 2 mm, modulus of elasticity in flexure: 2.0 GPa) was adhered to the epoxy resin. The filler layer (layer thickness: approximately 500 μm) and the substrate were thus formed. In this manner, a ninth embodiment of the radiation image storage panel in accordance with the present invention, which is illustrated in FIG. 20, was obtained.

Figure 20:
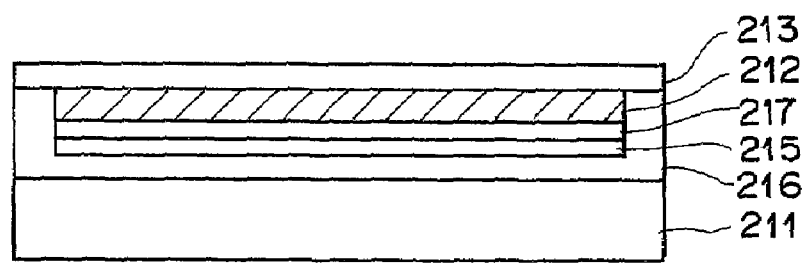
FIG. 20 is a schematic sectional view showing a ninth embodiment of the radiation image storage panel in accordance with the present invention.

FIG. 20 is a schematic sectional view showing the ninth embodiment of the radiation image storage panel in accordance with the present invention. As illustrated in FIG. 20, the ninth embodiment of the radiation image storage panel in accordance with the present invention comprises the substrate 211, a filler layer 216, the light reflecting layer 215, an adhesive layer 217, the stimulable phosphor layer 212, and the protective layer 213, which are located in this order.

As illustrated in FIG. 17, the two sides of the obtained radiation image storage panel, which two sides extended in the longitudinal direction of the radiation image storage panel and stood facing each other, were secured and supported by the supporting means 140, and the radiation image storage panel was thus held horizontally. In this state, the deflection quantity X at the center position of the radiation image storage panel was measured. The deflection quantity X was 72 μm. Also, the X-ray absorptivity of the substrate was approximately 5.5%.

X-rays were irradiated via an object to the substrate side of the radiation image storage panel, which had been obtained in the manner described above. Also, the image readout was performed from the protective layer side of the radiation image storage panel by use of the radiation image read-out apparatus shown in FIG. 7. As a result, an image having good image quality could be obtained.

EXAMPLE 7

1) A stimulable phosphor (CsBr:Eu) was vacuum-evaporated onto a surface of an alkali-free glass sheet (acting as a second substrate, size: 430 mm×450 mm, thickness: 0.5 mm) with the electron beam vacuum evaporation technique. In this manner, a stimulable phosphor layer (size: 410 mm×430 mm, layer thickness: approximately 500 μm) was formed on the alkali-free glass sheet. The stimulable phosphor layer had a structure such that prismatic crystals of the phosphor stood densely erect approximately in the vertical direction.

2) The glass sheet, on which the stimulable phosphor layer had been formed, was adhered to a surface of a CFRP sheet (acting as a first substrate, size: 430 mm×450 mm, thickness: 2 mm, modulus of elasticity in flexure: 2.0 GPa) by use of an adhesive agent, such that the second substrate side might be in contact with the surface of the CFRP sheet.

3) In order for the sealing properties to be imparted, a moisture-proof film (GL-AU, supplied by Toppan Printing Co., Ltd., thickness: 60 μm) was adhered to the surface of the stimulable phosphor layer and the exposed surface area of the second substrate by use of an adhesive agent, and a protective layer was thereby formed. In this manner, a tenth embodiment of the radiation image storage panel in accordance with the present invention, which is illustrated in FIG. 21, was obtained.

Figure 21:
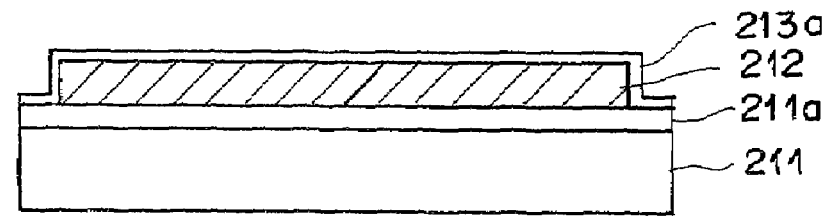
FIG. 21 is a schematic sectional view showing a tenth embodiment of the radiation image storage panel in accordance with the present invention.

FIG. 21 is a schematic sectional view showing the tenth embodiment of the radiation image storage panel in accordance with the present invention. As illustrated in FIG. 21, the tenth embodiment of the radiation image storage panel in accordance with the present invention comprises the first substrate 211, the second substrate 211a, the stimulable phosphor layer 212, and a protective layer 213a, which are located in this order.

As illustrated in FIG. 17, the two sides of the substrate of the obtained radiation image storage panel, which two sides extended in the longitudinal direction of the radiation image storage panel and stood facing each other, were secured and supported by the supporting means 140, and the radiation image storage panel was thus held horizontally. In this state, the deflection quantity X at the center position of the radiation image storage panel was measured. The deflection quantity X was 68 µm. Also, the X-ray absorptivity of the entire substrate (i.e., the combination of the first substrate 211 and the second substrate 211a) was approximately 10%.

X-rays were irradiated via an object to the substrate side of the radiation image storage panel, which had been obtained in the manner described above. Also, the image readout was performed from the protective layer side of the radiation image storage panel by use of the radiation image read-out apparatus shown in FIG. 7. As a result, an image having good image quality could be obtained.

Also, as a different technique for the radiation image recording and reproducing method, a novel radiation image forming method has been proposed in, for example, Japanese Patent Application No. 2000-400426. With the proposed radiation image forming method, the radiation absorbing functions and the energy storing functions of the conventional stimulable phosphor are separated from each other. Specifically, for example, a combination of a radiation image storage panel, which comprises a stimulable phosphor (i.e., a phosphor for energy storage), and a fluorescent screen, which contains a phosphor (i.e., a phosphor for radiation absorption) capable of absorbing the radiation and emitting light having wavelengths falling within the ultraviolet to visible region, is utilized. With the proposed radiation image forming method, the radiation carrying image information of an object is firstly converted by the phosphor for radiation absorption, which is contained in the fluorescent screen or may be contained in the radiation image storage panel, into the light having wavelengths falling within the ultraviolet to visible region. Energy of the thus obtained light is stored as the radiation image information on the phosphor for energy storage, which is contained in the radiation image storage panel. Thereafter, the radiation image storage panel is exposed to the stimulating rays and caused to emit light. The light emitted by the radiation image storage panel is photoelectrically detected, and an image signal representing the radiation image information is thereby obtained. The radiation image storage panel and the fluorescent screen described above are also embraced in the scope of the present invention.

What is claimed is:

1. A radiation image storage panel, comprising:
    i) a first rigid layer,
    ii) a stimulable phosphor layer, which is coated or vapor-deposited on the first rigid layer,
    iii) a filler layer located by adhesion on a side of the first rigid layer, on which side the stimulable phosphor layer is coated or vapor-deposited, and
    iv) a second rigid layer, which is overlaid by adhesion on the filler layer,
    a density of the filler layer being lower than the density of the first rigid layer and the density of the second rigid layer.

2. A radiation image storage panel as defined in claim 1, wherein portions of the first rigid layer are not covered by the stimulable phosphor layer, and wherein the filler layer is in contact with the stimulable phosphor layer and the portions of the first rigid layer not covered by the stimulable phosphor layer.

3. A radiation image storage panel as defined in claim 1, further including an adhesive disposed between the filler layer and the first rigid layer to provide the adhesion between the filler layer and the first rigid layer, and an adhesive disposed between the second rigid layer and the filler layer to provide the adhesion between the second rigid layer and the filler layer.

4. A radiation image storage panel, comprising a rigid sheet and a phosphor layer formed on the rigid sheet,
    wherein a deflection quantity of the radiation image storage panel, which deflection quantity occurs when the radiation image storage panel is supported at two sides of the radiation image storage panel, the two sides standing to face each other, and the radiation image storage panel is thus held horizontally,
    wherein the deflection quantity of the radiation image storage panel is at most 500 µm, and
    wherein a thickness D (in units of mm) of the rigid sheet satisfies the formula:

$L/110 < D < 15$ wherein L (in units of mm) represents the distance between the positions which secure and support the two sides of the radiation image storage panel.

5. A radiation image storage panel as defined in claim 4 wherein the rigid sheet is constituted of a glass sheet.

6. A radiation image storage panel as defined in claim 4 wherein the phosphor layer is formed on the rigid sheet such that the phosphor layer is in contact with the rigid sheet.

7. A radiation image storage panel as defined in claim 4 wherein the phosphor layer is a layer constituted of a stimulable phosphor.

8. A radiation image storage panel, comprising a rigid substrate, which exhibits a radiation absorptivity of at most 20%, and a phosphor layer overlaid on the rigid substrate,
    wherein a deflection quantity of the radiation image storage panel, which deflection quantity occurs when the radiation image storage panel is secured and supported at two sides of the radiation image storage panel, the two sides standing to face each other, and the radiation image storage panel is thus held horizontally,
    wherein the deflection quantity of the radiation image storage panel is at most 200 µm.

9. A radiation image storage panel as defined in claim 8 wherein the radiation absorptivity of the rigid substrate is at most 10%.

10. A radiation image storage panel as defined in claim 8 wherein the rigid substrate is constituted of a carbon fiber-reinforced plastic sheet.

11. A radiation image storage panel as defined in claim 10 wherein a modulus of elasticity in flexure of the rigid substrate falls within the range of 13 MPa to 8 Gpa, and a thickness of the rigid substrate falls within the range of 1 mm to 3.5 mm.

12. A radiation image storage panel as defined in claim 11 wherein the modulus of elasticity in flexure of the rigid substrate falls within the range of 500 MPa to 4 Gpa, and the thickness of the rigid substrate falls within the range of 1.5 mm to 2.5 mm.

13. A radiation image storage panel as defined in claim 8 wherein a protective layer is formed on a surface of the phosphor layer, which surface is opposite to the surface side provided with the rigid substrate.

14. A radiation image storage panel as defined in claim 8 wherein the phosphor layer is a layer constituted of a stimulable phosphor.

* * * * *